US011316416B2

(12) United States Patent
Nakahara et al.

(10) Patent No.: US 11,316,416 B2
(45) Date of Patent: Apr. 26, 2022

(54) METHOD OF MANUFACTURING ROTOR, ROTOR, AND MOTOR

(71) Applicant: Nidec Corporation, Kyoto (JP)

(72) Inventors: Yasuaki Nakahara, Kyoto (JP); Keisuke Saito, Kyoto (JP); Takeshi Honda, Kyoto (JP); Hirofumi Muto, Kyoto (JP); Osamu Fujimoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 400 days.

(21) Appl. No.: 16/318,785

(22) PCT Filed: Sep. 30, 2016

(86) PCT No.: PCT/JP2016/079014
§ 371 (c)(1),
(2) Date: Jan. 18, 2019

(87) PCT Pub. No.: WO2018/061179
PCT Pub. Date: Apr. 5, 2018

(65) Prior Publication Data
US 2019/0190360 A1    Jun. 20, 2019

(51) Int. Cl.
*H02K 15/12* (2006.01)
*H02K 15/03* (2006.01)
(Continued)

(52) U.S. Cl.
CPC ............... *H02K 15/12* (2013.01); *H02K 1/27* (2013.01); *H02K 1/276* (2013.01); *H02K 1/28* (2013.01);
(Continued)

(58) Field of Classification Search
CPC .......... H02K 15/12; H02K 15/03; H02K 1/27; H02K 1/28; H02K 11/215; H02K 1/276; H02K 7/083; Y10T 29/49009
See application file for complete search history.

(56) References Cited

U.S. PATENT DOCUMENTS

| 3,979,821 A | * | 9/1976 | Noodleman | ......... H02K 13/006 |
| | | | | 29/598 |
| 5,255,425 A | * | 10/1993 | Kanno | ................ H02K 15/024 |
| | | | | 29/596 |

(Continued)

FOREIGN PATENT DOCUMENTS

| CN | 103580326 A | 2/2014 | |
| CN | 203423548 U | * 2/2014 | ........... H02K 1/2773 |

(Continued)

OTHER PUBLICATIONS

Official Communication issued in International Patent Application No. PCT/JP2016/079014, dated Dec. 13, 2016.
(Continued)

*Primary Examiner* — Peter Dungba Vo
*Assistant Examiner* — Jose K Abraham
(74) *Attorney, Agent, or Firm* — Keating & Bennett

(57) ABSTRACT

A method of manufacturing a rotor includes forming plates each including a scrap portion that has a center hole and core plate portions that are disposed continuously with the scrap portion on an inner side of the center hole and that each defines a portion of a corresponding one of the outer cores forming a multilayer body including the outer cores by stacking the plates, setting at least a portion of the multilayer body and a portion of the inner core in a mold with a gap therebetween in the radial direction, forming a molded body by pouring a molten filling material into a gap in the mold and forming the filling section, at least a portion of the filling (Continued)

section being positioned between the outer cores, and separating the scrap portion and the core plate portions from each other.

7 Claims, 23 Drawing Sheets

(51) Int. Cl.
   *H02K 1/28* (2006.01)
   *H02K 11/215* (2016.01)
   *H02K 1/27* (2006.01)
   *H02K 7/08* (2006.01)
   *H02K 1/276* (2022.01)

(52) U.S. Cl.
   CPC ............ *H02K 7/083* (2013.01); *H02K 11/215* (2016.01); *H02K 15/03* (2013.01); *Y10T 29/49009* (2015.01)

(56) References Cited

U.S. PATENT DOCUMENTS

| | | | |
|---|---|---|---|
| 6,392,324 B1 | 5/2002 | Kuwahara | |
| 6,734,596 B1 | 5/2004 | Liao | |
| 6,848,165 B1* | 2/2005 | Furuse | H02K 16/02 29/596 |
| 7,667,367 B2 | 2/2010 | Matsuo et al. | |
| 8,683,675 B2 | 4/2014 | Yuya et al. | |
| 9,178,394 B2 | 11/2015 | Asahi et al. | |
| 2009/0085416 A1* | 4/2009 | Masuzawa | H01F 1/26 310/44 |
| 2012/0112599 A1* | 5/2012 | Park | H02K 1/148 310/216.009 |
| 2013/0049493 A1* | 2/2013 | Zhao | H02K 1/28 310/43 |
| 2013/0057103 A1* | 3/2013 | Han | H02K 1/2773 310/156.12 |
| 2013/0061640 A1 | 3/2013 | Kim et al. | |
| 2013/0119808 A1 | 5/2013 | Hirokawa et al. | |
| 2014/0042834 A1* | 2/2014 | Asahi | H02K 15/03 310/43 |
| 2014/0042854 A1 | 2/2014 | Asahi et al. | |
| 2015/0061446 A1* | 3/2015 | Hidaka | H02K 15/03 310/156.43 |
| 2016/0352199 A1 | 12/2016 | Honda et al. | |

FOREIGN PATENT DOCUMENTS

| | | |
|---|---|---|
| CN | 106208556 A | 12/2016 |
| JP | 53-4803 A | 1/1978 |
| JP | 59-72968 A | 4/1984 |
| JP | 10-127015 A | 5/1998 |
| JP | 10-322976 A | 12/1998 |
| JP | 2001-204146 A | 7/2001 |
| JP | 2003-102136 A | 4/2003 |
| JP | 2004-112951 A | 4/2004 |
| JP | 2004-215474 A | 7/2004 |
| JP | 2006-121807 A | 5/2006 |
| JP | 2006-158092 A | 6/2006 |
| JP | 2007-295668 A | 11/2007 |
| JP | 2014-036457 A | 2/2014 |
| WO | 2010/082465 A1 | 7/2010 |

OTHER PUBLICATIONS

Honda et al., "Manufacturing Method of Rotor Core, Manufacturing Method of Rotor, Rotor and Motor", U.S. Appl. No. 15/158,699, filed May 19, 2016.

* cited by examiner

METHOD OF MANUFACTURING ROTOR, ROTOR, AND MOTOR

BACKGROUND OF THE INVENTION

1. Field of the Invention

The present disclosure relates to a method of manufacturing a rotor, the rotor, and a motor.

2. Description of the Related Art

Hitherto, a motor including a spoke-type rotor has been known.

Among motors such as that described above, there are those in which a plurality of fit-in-type small teeth are fixed by being integrally molded by using a resin. However, in this case, it is necessary to pour the resin into a mold while holding the fit-in-type small teeth by, for example, the mold or a jig. Therefore, workability is poor and it may become more troublesome to manufacture the rotor.

SUMMARY OF THE INVENTION

An exemplary method of manufacturing a rotor of the present disclosure is a method of manufacturing a rotor including a cylindrical inner core that is disposed along a center axis, a plurality of outer cores that are disposed side by side in a peripheral direction on an outer side of the inner core in a radial direction, and a filling section that covers at least a portion of the inner core and at least a portion of each of the plurality of outer cores. The method includes forming plates each including a scrap portion that has a center hole extending therethrough in an axial direction and core plate portions that are disposed continuously with the scrap portion on an inner side of the center hole and that each defines a portion of a corresponding one of the outer cores; forming a multilayer body including the outer cores by stacking the plates; setting at least a portion of the multilayer body and a portion of the inner core in a mold with a gap therebetween in the radial direction; forming a molded body by pouring a molten filling material into a gap in the mold and forming the filling section, at least a portion of the filling section being positioned between the outer cores; and separating the scrap portion and the core plate portions from each other.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Figure 1:
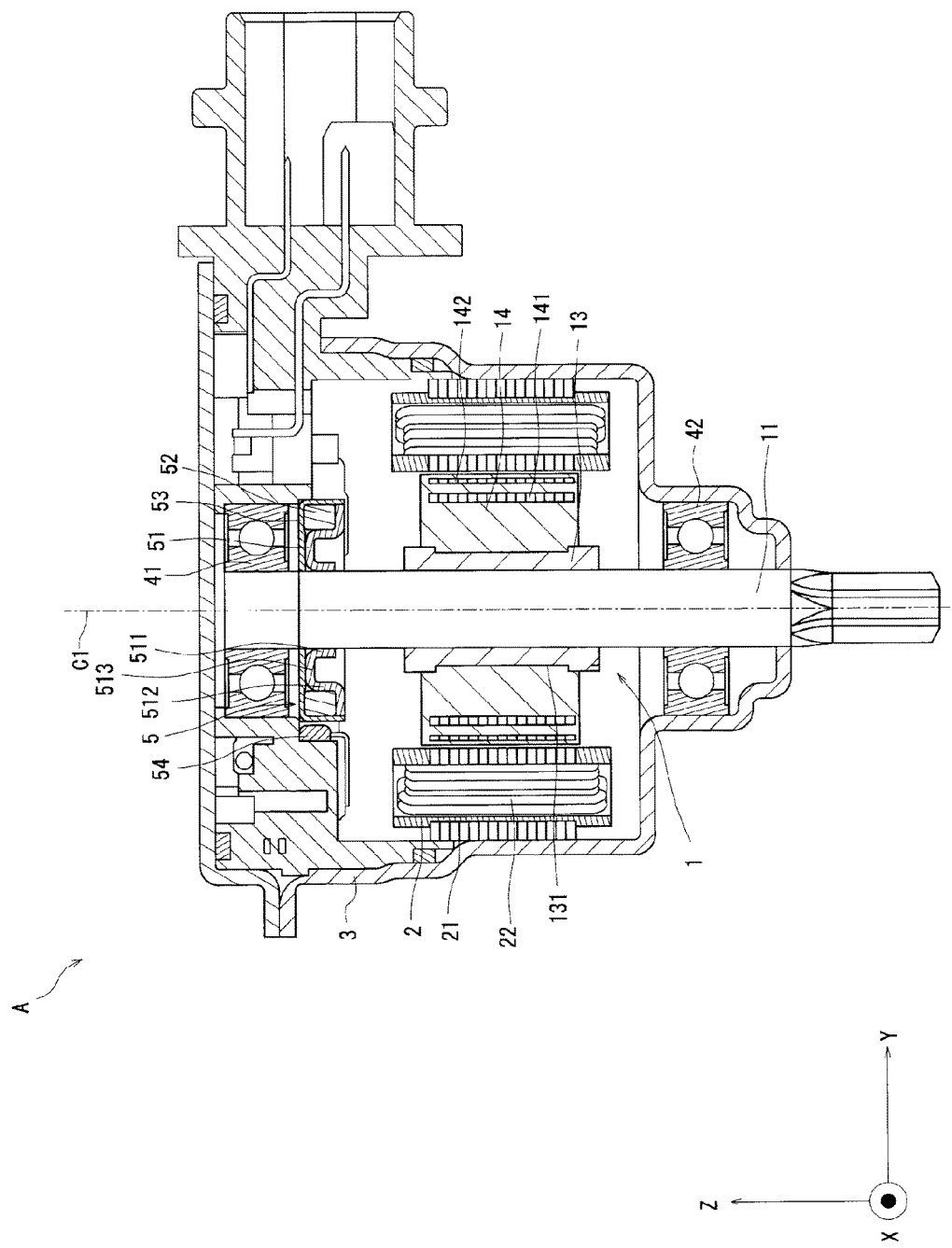
FIG. 1 is a sectional view of a motor of a first exemplary embodiment of the present invention.

Motors according to exemplary embodiments of the present disclosure are described below with reference to the drawings. Note that the scope of the present disclosure is not limited to the embodiments below and can be optionally changed within the scope of the technical idea of the present disclosure. In the drawings below, in order to simplify each structure, for example, the scale of each structure and the number of structures may differ from the scale of each actual structure and the number of actual structures.

In the drawings, an XYZ coordinate system is shown as a three-dimensional orthogonal coordinate system as appropriate. In the XYZ coordinate system, a Z-axis direction is a direction parallel to an axial direction of a center axis C1 shown in FIG. 1. A Y-axis direction is a direction that is orthogonal to the Z-axis direction. An X-axis direction is a direction orthogonal to both the Y-axis direction and the Z-axis direction.

In the state shown in FIG. 1, in the Z axis, an upper side is a positive side (+Z side) and a lower side is a negative side (−Z side). In addition, the positive side (+Z side) in the Z-axis direction is called a "first side", and the negative side (−Z side) in the Z-axis direction is called a "second side". Note that "first side" and "second side" are names merely used for explanation and do not limit the actual positional relationships and directions. Unless otherwise particularly indicated, the direction (Z-axis direction) parallel to the center axis C1 is simply called the "axial direction", a radial direction around the center axis C1 as the center is simply called a "radial direction", and a direction along an arc around the center axis C1 as the center, that is, a peripheral direction around the center axis C1 is simply called a "peripheral direction".

A general structure of a motor according to an exemplary first embodiment of the present disclosure is described. FIG. 1 is a sectional view of the motor.

As shown in FIG. 1, a motor A includes a rotor 1, a stator 2, a housing 3, a first bearing 41, and a second bearing 42.

The motor A also includes a sensor unit 5 that detects a rotational position of the rotor 1.

The housing 3 has a cylindrical shape extending in the axial direction. The stator 2 is fixed to an inner peripheral surface of the housing 3. By fixing the stator 2 inward of the housing, the center axis of the stator 2 matches the center axis of the housing 3 (the center axis C1).

The stator 2 surrounds an outer side of the rotor 1 in the radial direction. The center axis of the stator 2 and the center axis of the rotor 1 match (the center axis C1). The stator 2 includes a stator core 21 and coils 22. The stator 2 includes the plurality of the coils 22 facing the rotor 1.

The coils 22 are formed by winding conducting wires around an outer periphery of an insulator (not shown) that covers an outer surface of the stator core 21. An end portion of each conducting wire extends from each coil 22, and the end portion of each conducting wire extends from an end portion of the stator 2 on the first side in the axial direction towards the first side in the axial direction. By supplying electric power to the coils 22 via the conducting wires, the stator 2 is excited. For example, the coils 22 of the motor A are divided into three phases (U, V, W). In addition, for the phases, electric currents having sinusoidal waveforms that are out of phase are supplied. Therefore, the number of conducting wires that allow electric currents to be supplied for the three phases is provided. In the embodiment, there are two sets of three phases.

A shaft 11 (described later) of the rotor 1 is rotatably supported by the first bearing 41, and the second side of the shaft 11 is rotatably supported by the second bearing 42. That is, the rotor 1 is rotatably supported by the first bearing 41 and the second bearing 42.

Here, the first bearing 41 and the second bearing 42 are ball bearings. The shaft 11 is rotatably supported by the housing 3 with the first bearing 41 and the second bearing 42 interposed therebetween. Here, the center axis of the shaft 11 matches the center axis C1 of the housing 3.

Figure 2:
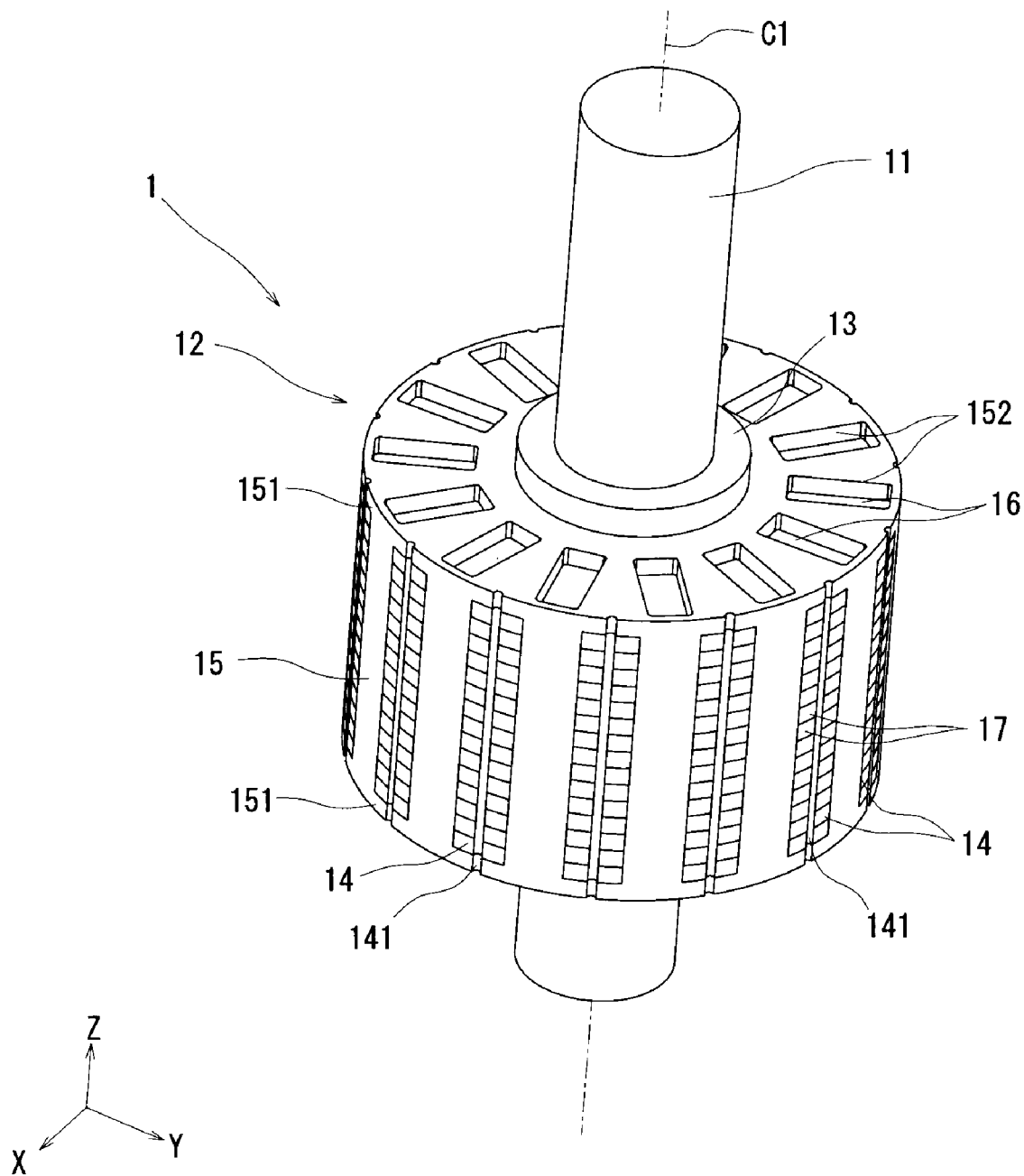
FIG. 2 is a perspective view of a rotor.
Figure 3:
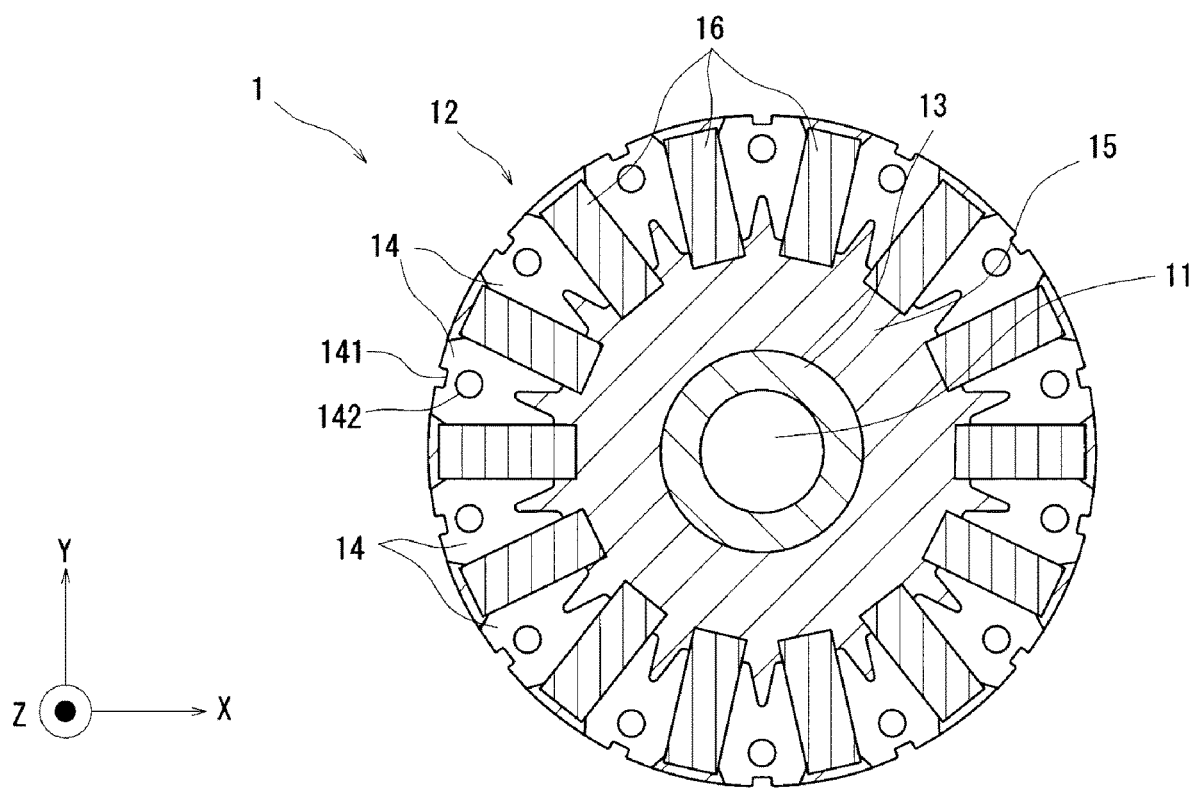
FIG. 3 is a sectional view of the rotor shown in FIG. 2 cut by a plane orthogonal to a center axis.
Figure 4:
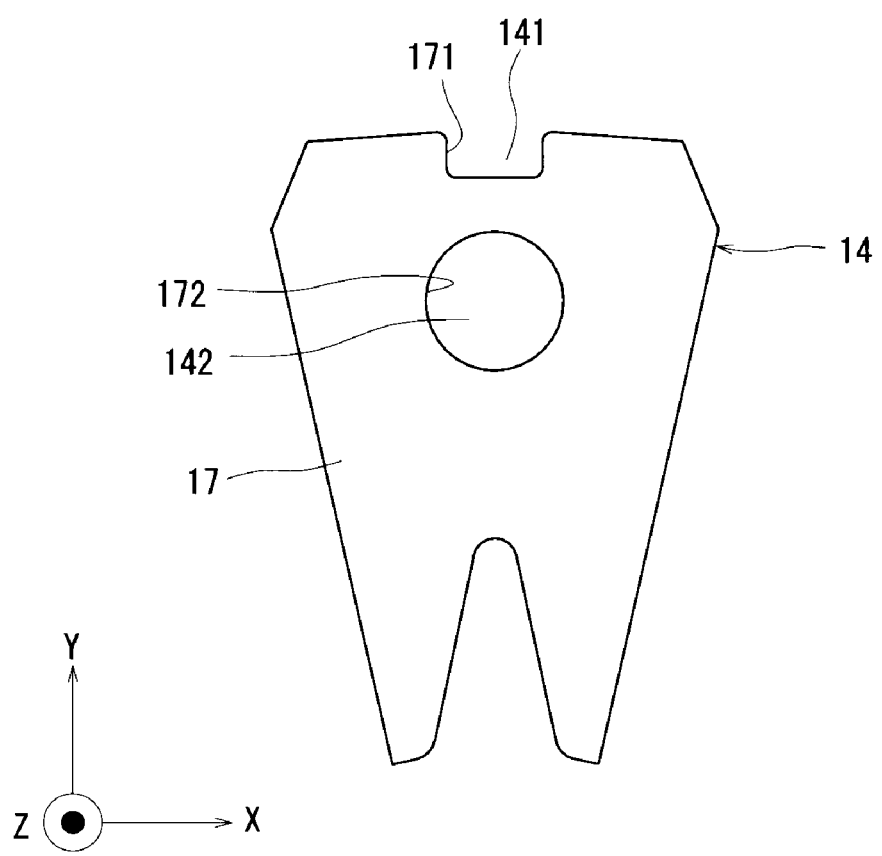
FIG. 4 is a plan view of an outer core as seen in an axial direction.

FIG. 2 is a perspective view of the rotor. FIG. 3 is a sectional view of the rotor shown in FIG. 2 cut by a plane orthogonal to the center axis. FIG. 4 is a plan view of an outer core as seen in the axial direction. As shown in FIG. 2, the rotor 1 is a so-called spoke-type rotor. The rotor 1 includes the shaft 11 and a rotor core 12. The rotor 1 is rotatable relative to the center axis C1 as the center with respect to the stator 2.

The shaft 11 has a columnar or substantially columnar shape extending in the axial direction (the Z-axis direction). The shaft 11 is rotatably supported by the housing 3 with the first bearing 41 and the second bearing 42 interposed therebetween. This allows the rotor 1 to be rotatable with respect to the stator 2 around the center axis C1 as the center. The shaft 11 is fixed to the rotor core 12 by press-fitting. Note that the fixing of the shaft 11 and the rotor core 12 to each other is not limited to press-fitting. Methods that allow the shaft 11 and the rotor core 12 to be fixed to each other can be widely used.

As shown in FIG. 2, the rotor core 12 includes an inner core 13, a plurality of outer cores 14, a filling section 15, and a plurality of permanent magnets 16. In the explanation below, the "inner core" and the "outer cores" refer to the "inner core of the rotor core" and the "outer cores of the rotor core". The rotor core 12 is formed by, for example, a molding operation in which the inner core 13 and the plurality of outer cores 14 are disposed in a mold and a resin or a nonmagnetic material is poured into the mold.

The inner core 13 has a cylindrical or substantially cylindrical shape placed along the center axis C1. The shaft 11 is press-fitted to the inside of the inner core 13. Therefore, the inner core 13 is made of a material that allows the shaft 11 to be press-fitted. The inner core 13 may be made of the same material as the outer cores 14. The inner core 13 has a grooved portion 131 in an outer peripheral surface thereof so as to be recessed inward in the radial direction (FIG. 1). The grooved portion 131 extends in the axial direction. One grooved portion 131 or a plurality of grooved portions 131 may be disposed in the peripheral direction. The grooved portion 131 is formed by, for example, a staking operation.

The plurality of outer cores 14 are disposed side by side in the peripheral direction on an outer side of the inner core 13 in the radial direction. The filling section 15 covers at least a part of the inner core 13 and at least a part of each outer core 14.

As shown in FIG. 3, the plurality of outer cores 14 are disposed apart from each other in the peripheral direction on an outer side of the shaft 11 in the radial direction. The plurality of permanent magnets 16 are each disposed between adjacent outer cores 14. The outer cores 14 are excited by the permanent magnets 16. That is, the rotor core 12 includes the plurality of permanent magnets 16 that excite at least the outer cores 14.

The magnetic poles of the plurality of outer cores 14 excited by the permanent magnets 16 differ from those of outer cores 14 adjacent thereto. For example, an outer core 14 that is adjacent to an outer core 14 that is excited to be an N pole is excited to be an S pole. That is, in the rotor core 12, the outer cores 14 that are excited to be the N pole and the outer cores 14 that are excited to be the S pole are alternately disposed.

As shown in FIG. 3, each outer core 14 has in cross section a fan or substantially fan shape whose size in the peripheral direction increases from an inner side in the radial direction to an outer side in the radial direction. Corners of each outer core 14 on the outer side in the radial direction are such that, for example, both sides in the peripheral direction are chamfered. The chamfering of the corners of the outer cores 14 may be corner chamfering or round chamfering. In the example shown in FIG. 3, the corners of the outer cores 14 on the outer side in the radial direction are corner-chamfered.

As shown in FIG. 1, each outer core 14 includes a plurality of core plate portions 17 that are stacked upon each other in the axial direction. The core plate portions 17 are electromagnetic steel plates, which are a type of magnetic material.

As shown in FIG. 4, each core plate portion 17 includes a connecting recessed portion 171, which is a recessed portion recessed inward in the radial direction. Therefore, it is easy to use the method of manufacturing the rotor 1 described below. By stacking the core plate portions 17, the connecting recessed portion 171 of each core plate portion 17 is stacked. Consequently, as shown in FIGS. 3 and 4, each core recessed groove 141 extending in the axial direction is disposed in an outer end of its corresponding outer core 14 in the radial direction.

As shown in FIG. 4, each core plate portion 17 includes a core-plate-portion through hole 172 extending through the core plate portion 17 in the axial direction. The shape of each core-plate-portion through hole 172 in plan view is circular. Note that the shape of each core-plate-portion through hole 172 in plan view is not particularly limited and may be elliptical or substantially elliptical, or polygonal or substantially polygonal.

As shown in FIG. 1, the outer cores 14 include an outer-core through hole 142 extending through the outer cores 14 in the axial direction. The outer-core through hole 142 is formed by connecting the plurality of core-plate-portion through holes 172 in the axial direction. A part of the filling section 15 is disposed at the outer-core through hole 142. That is, the core plate portions 17 are fixed to each other by the filling section 15 disposed inside the outer-core through hole 142.

As shown in FIG. 3, the filling section 15 is disposed on the outer side of the inner core 13 in the radial direction. In the embodiment, the filling section 15 is fixed to an outer peripheral surface of the inner core 13. More specifically, the filling section 15 is fixed to a portion of the outer peripheral surface of the inner core 13 where the grooved portion 131 is provided. In other words, the grooved portion 131 is positioned where it contacts the filling section 15.

At least a part of the filling section 15 is positioned between the plurality of outer cores 14. The filling section 15 covers at least a part of each of the plurality of outer cores 14. In the embodiment, the filling section 15 is made of a resin. Note that the material of the filling section 15 is not limited to resin, so that, for example, a nonmagnetic material may be used. Examples of the nonmagnetic material include aluminum and stainless steel. In the embodiment, the filling section 15 holds the plurality of outer cores 14.

Note that, in the description, "at least a part of the filling section is positioned between the plurality of outer cores 14" implies that "at least a part of the filling section is positioned on a line connecting any two outer cores of the plurality of outer cores". The any two outer cores of the plurality of outer cores are not particularly limited and may be two outer cores adjacent to each other in the peripheral direction or two outer cores 14 facing each other in the radial direction with the inner core 13 interposed therebetween. In FIG. 3, a part of the filling section 15 is positioned between outer cores 14 that are adjacent to each other in the peripheral direction.

As shown in FIG. 2, the filling section 15 includes cover portions 151, one covering the first side and the other covering the second side of each outer core 14 in the axial direction. The shape of each cover portion 151 in plan view is a disc or substantially disc shape through whose center the center axis C1 passes. The cover portion 151 that covers the first side of the filling section 15 in the axial direction has a plurality of magnet insertion holes 152 in which the permanent magnets 16 are inserted. The plurality of magnet insertion holes 152 are disposed between the plurality of outer cores 14 in the peripheral direction.

As shown in FIG. 3, the permanent magnets 16 excite the outer cores 14. Each permanent magnet 16 has a rectangular parallelepiped or substantially rectangular parallelepiped shape extending in the radial direction. Each permanent magnet 16 includes two magnetic poles that are disposed in the peripheral direction. The same poles of the permanent magnets 16 that are adjacent to each other in the peripheral direction face each other in the peripheral direction. Therefore, the outer cores 14 disposed between permanent magnets 16 whose north poles face each other are excited to be N poles. In contrast, the outer cores 14 disposed between permanent magnets 16 whose S poles face each other are excited to be S poles.

As shown in FIG. 1, the sensor unit 5 includes a sensor yoke 51, a sensor magnet 52, a sensor cover 53, and rotation sensors 54. The sensor yoke 51 is a substantially cylindrical member. The sensor yoke 51 is made of a magnetic material. The sensor yoke 51 includes a cylindrical inner wall portion 511, a cylindrical outer wall portion 512, and a top plate portion 513. In the embodiment, the inner wall portion 511 and the outer wall portion 512 each have a cylindrical or substantially cylindrical shape. The sensor yoke 51 is such that an inner surface of the inner wall portion 511 is fixed to an outer peripheral surface of the shaft 11. This causes the sensor yoke 51 to be fixed to the shaft 11.

As shown in FIG. 1, the outer wall portion 512 is positioned on an outer side of the inner wall portion 511 in the radial direction and surrounds the inner wall portion 511 in the peripheral direction. That is, the sensor yoke 51 has a double cylindrical or substantially cylindrical shape. The top plate portion 513 has a ring or substantially ring shape that connects an upper end portion of the inner wall portion 511 and an upper end portion of the outer wall portion 512.

The sensor magnet 52 has a ring or substantially ring shape. The sensor magnet 52 is held by the sensor yoke 51. For example, the sensor magnet 52 is fitted to the outer wall portion 512 from an outer side in the radial direction. Therefore, the sensor magnet 52 is indirectly fixed to the shaft 11 with the sensor yoke 51 interposed therebetween. Note that the sensor magnet 52 may be directly fixed to the shaft 11.

Each rotation sensor 54 faces the sensor magnet 52 in the radial direction with a gap therebetween. Each rotation sensor 54 is, for example, a Hall IC, and the plurality of rotation sensors 54 are provided. The rotation sensors 54 detect changes in magnetic flux of the sensor magnet 52. On the basis of the detected changes in the magnetic flux, the rotational position of the rotor 1 is calculated in, for example, a control device (not shown) that controls the motor A. Note that the rotation sensors 54 may face the sensor magnet 52 in the axial direction with a gap therebetween. Note that, in the embodiment, although sensors using Hall ICs may be used, the rotation sensors 54 are not limited thereto. For example, sensors that are capable of detecting rotation of the rotor, such as resolvers, may be widely used.

Figure 5:
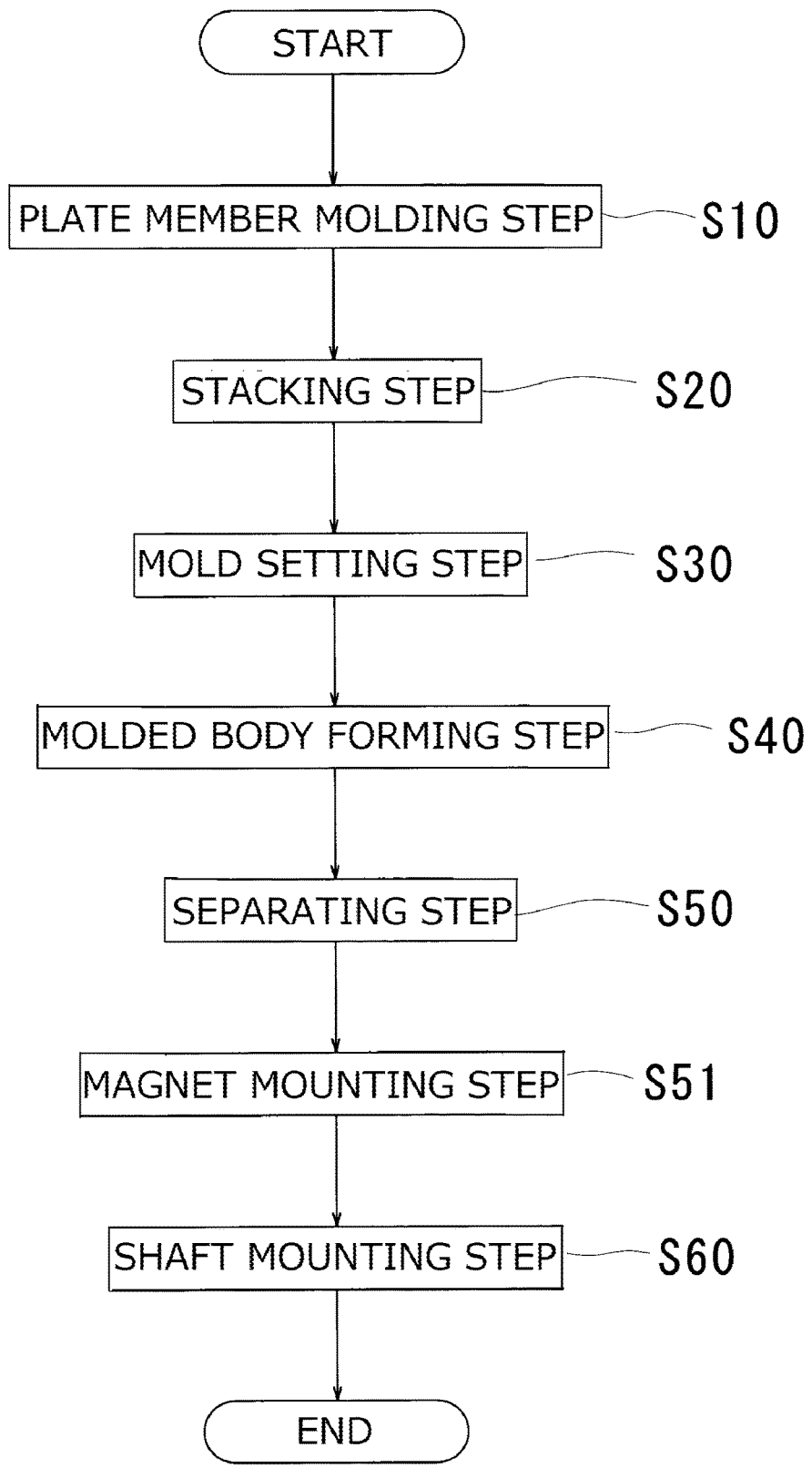
FIG. 5 is a flowchart showing a method of manufacturing the motor of the exemplary first embodiment of the present disclosure.
Figure 6:
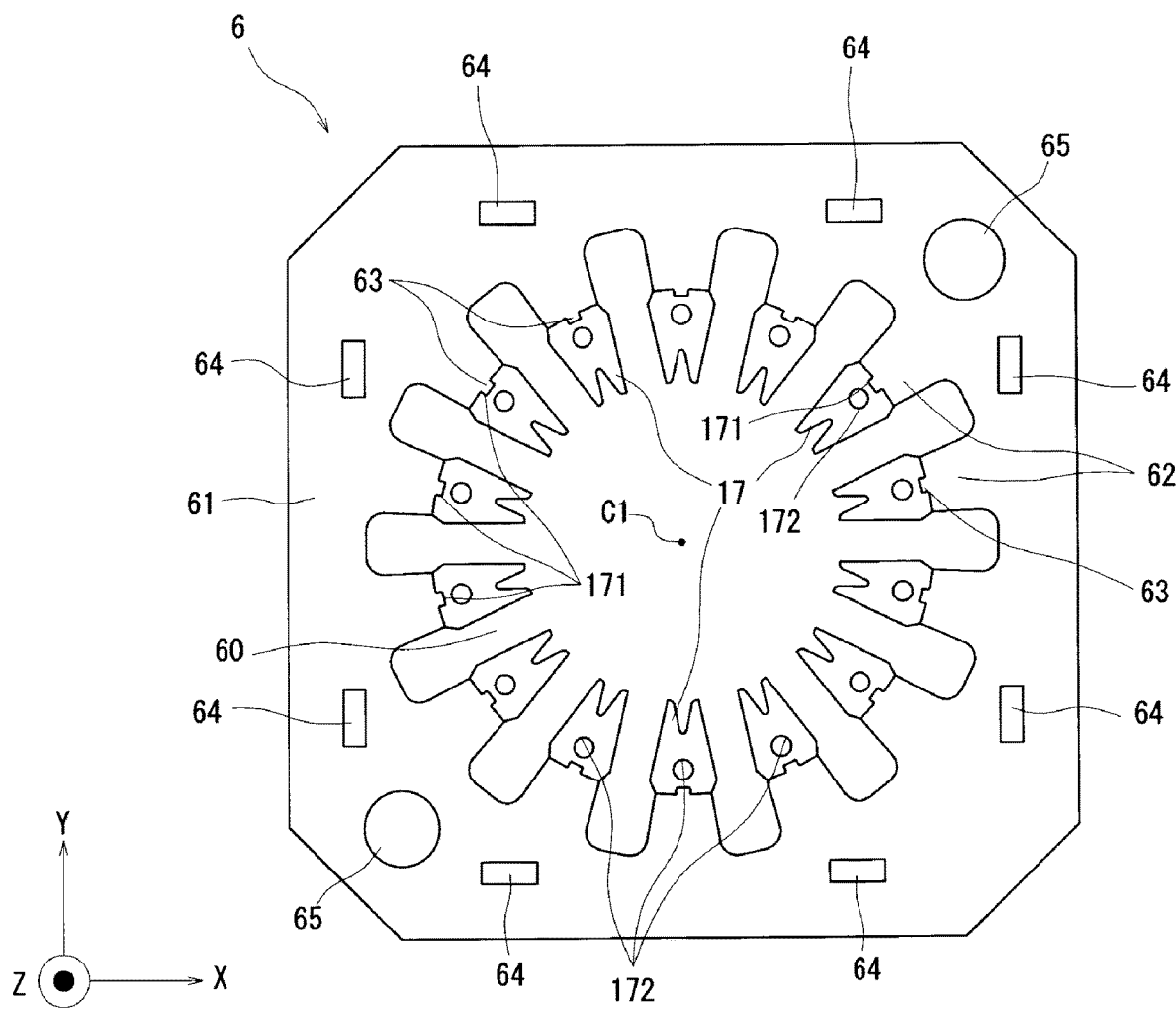
FIG. 6 is a plan view of a plate.

The method of manufacturing the rotor described above is described with reference to the drawings. FIG. 5 is a flowchart showing the method of manufacturing the rotor of the exemplary first embodiment of the present disclosure. FIG. 6 is a plan view of a plate member. FIGS. 7 to 17 each show a part of a corresponding step in the method of manufacturing the rotor shown in FIG. 5.

As shown in FIG. 5, the method of manufacturing the rotor of the embodiment includes a plate member forming step S10, a stacking step S20, a mold setting step S30, a molded body forming step S40, a separating step S50, a magnet mounting step S51, and a shaft mounting step S60. Note that, in the method of manufacturing the rotor of the embodiment, the steps from the plate member forming step S10 to the magnet mounting step S51 are manufacturing steps of the rotor core 12.

The plate member forming step S10 is a step of forming a plate member 6 shown in FIG. 6. The plate member 6 is a member having a plate-like or substantially plate-like shape. The shape of the plate member 6 in plan view is a square or substantially square shape. In plan view, the four corners of the plate member 6 are chamfered. The plate member 6 includes a scrap portion 61 and a plurality of core plate portions 17. The scrap portion 61 has a ring or substantially ring shape having a center hole 60 extending therethrough in the axial direction.

Note that, in the description, "a certain member has a ring or substantially ring shape" implies a case in which "a certain member has a shape that is continuous along one entire circuit therearound". That is, examples of the ring or substantially ring shape include a circular ring or substantially ring shape, an elliptical ring or substantially elliptical ring shape, a square ring or substantially square ring shape, and a rectangular ring or substantially rectangular ring shape. "A certain member has a ring or substantially ring shape" implies a case in which a certain member has a shape that is continuous along one entire circuit therearound, or a case in which a certain member has a shape that is discontinuous in a portion of one circuit therearound.

The scrap portion 61 includes extending portions 62, connecting protruding portions 63, and fixing portions 64. The scrap portion 61 is a ring-shaped or substantially ring-shaped portion that defines the center hole 60. Each extending portion 62 extends inward in the radial direction from an inner edge of the center hole 60. Each extending portion 62 includes the connecting protruding portion 63 on an end portion on an inner side thereof in the axial direction. Each extending portion 62 is connected to the scrap portion 61 and extends in the radial direction.

In FIG. 6, each connecting protruding portion 63 is a protruding portion that protrudes inward in the radial direction. More specifically, each connecting protruding portion 63 is a protruding portion that protrudes inward in the radial direction from an end of each extending portion 62 on an inner side in the radial direction. The shape of each connecting protruding portion 63 in plan view is a rectangular or substantially rectangular shape. The shape of each connecting protruding portion 63 is a shape in accordance with the shape of the connecting recessed portion 171 of its corresponding core plate portion 17.

In the plate member 6, the core plate portions 17 are disposed continuously with the scrap portion 61 on an inner side of the scrap portion 61 in the radial direction. By fitting the connecting recessed portions 171 of the core plate portions 17 to the connecting protruding portions 63, the core plate portions 17 are connected to the scrap portion 61. As described above, each connecting recessed portion 171 may have a portion whose peripheral-direction size is larger than that of a radial-direction outer end of each connecting recessed portion 171, on an inner side of the radial-direction outer end in the radial direction. Such a shape allows radial-direction movement of the connecting recessed portions 171 fitted to the connecting protruding portions 63 to be suppressed. Therefore, it is possible to suppress movement and removal in the radial direction of the core plate portions 17 with respect to the scrap portion 61. When the core plate portions 17 move in the axial direction with the connecting portions as fulcra, an inner end surface of each connecting protruding portion 63 in the radial direction and an outer end surface of each connecting recessed portion 171 in the radial direction interfere with each other to suppress movement of the core plate portions 17 in the axial direction. Therefore, it is possible to suppress movement of the core plate portions 17 in the axial direction and removal of the core plate portions 17 from the scrap portion 61.

As described above, an inner side surface of each connecting recessed portion 171 is inclined in the peripheral direction such that the size of each connecting recessed portion 171 in the peripheral direction is increased towards the inner side in the radial direction from the outer side in the radial direction. Therefore, when the core plate portions 17 move in the axial direction with the connecting portions as fulcra, a side surface of each connecting protruding portion 63 and the inner side surface of each connecting recessed portion 171 interfere with each other to suppress movement of the core plate portions 17 in the axial direction. Therefore, it is possible to suppress movement of the core plate portions 17 in the axial direction and removal of the core plate portions 17 from the scrap portion 61.

The scrap portion 61 includes the plurality of the fixing portions 64 (eight fixing portions 64 in FIG. 6). It is desirable that each fixing portion 64 be point-symmetrically disposed around the center axis C1 as the center. The shape of each fixing portion 64 in plan view is, for example, a rectangular or substantially rectangular shape. Each fixing portion 64 has a pushed-out shape pushed out towards the second side in the axial direction. When the fixing portion 64 are superimposed upon a scrap portion 61, the fixing portions 64 overlap the scrap portion 61 in the axial direction. When a portion pushed out from each fixing portion 64 on the first side in the axial direction is fitted to a corresponding fixing portion 64, the scrap portions 61 are fixed in the axial direction. That is, the scrap portions 61 superimposed upon each other in the axial direction are fixed by a crimping operation by making use of the fixing portions 64.

As shown in FIG. 6, pin holes 65 are provided in two of the four corners of the scrap portion 61, the two corners facing each other and symmetrically formed with respect to the center axis C1. In the embodiment, the number of pin holes 65 is two. The pin holes 65 extend through the plate member 6 in the axial direction.

Figure 7:
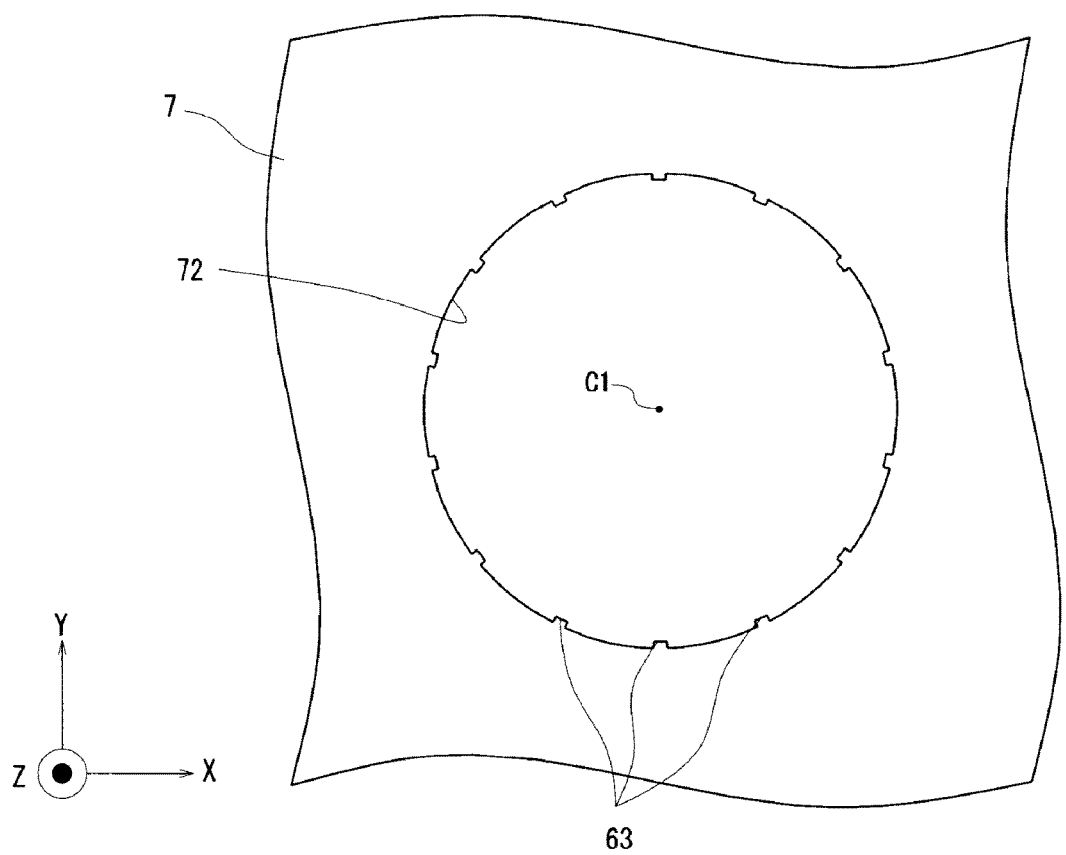
FIG. 7 shows a portion of a plate molding step S10.
Figure 8:
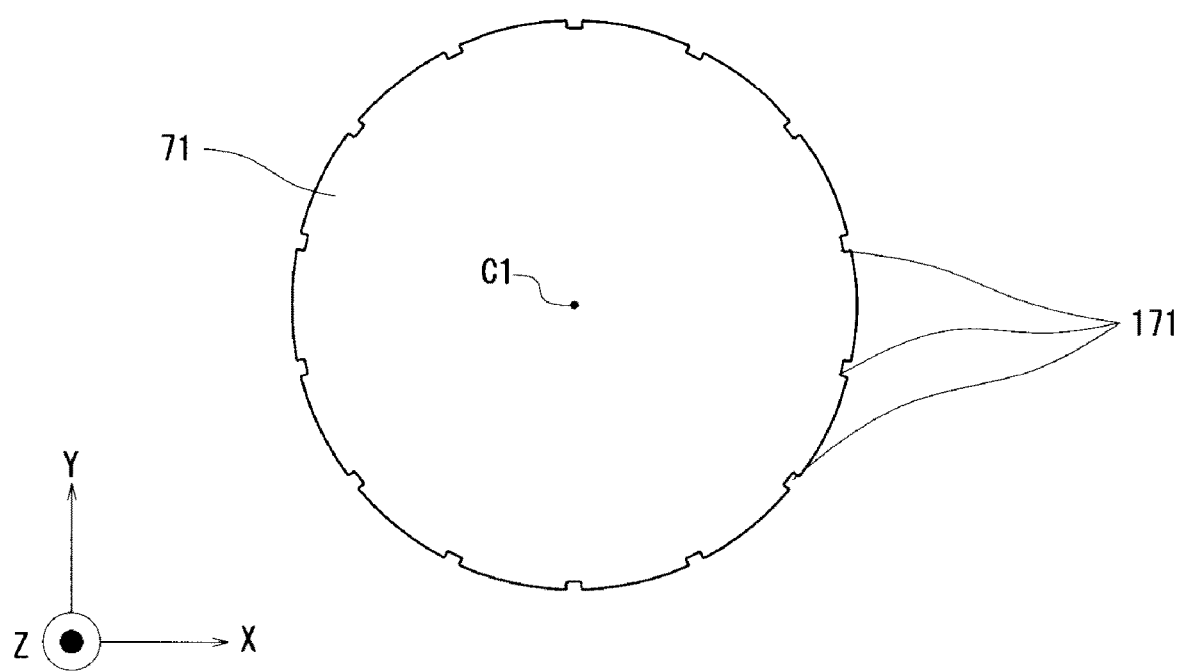
FIG. 8 shows a portion of the plate molding step S10.

In the plate member forming step S10, the plate member 6 where the core plate portions 17 have been fitted to the scrap portion 61 is formed. In the plate member forming step S10, first, a belt-shaped or substantially belt-shaped electromagnetic steel plate 7 is punched to form a disc portion 71 (FIG. 8) and a through hole 72 (FIG. 7). The shape of the disc portion 71 shown in FIG. 8 in plan view is a circular or substantially circular shape. The disc portion 71 includes a plurality of connecting recessed portions 171 at its outer edge. The plurality of connecting recessed portions 171 are disposed at equal intervals in the peripheral direction at the outer edge of the disc portion 71.

The through hole 72 shown in FIG. 7 is formed by punching out the disc portion 71 from the electromagnetic steel plate 7. The through hole 72 includes a plurality of connecting protruding portions 63 extending inward in the radial direction from an inner edge. The plurality of connecting protruding portions 63 are disposed at equal intervals in the peripheral direction at the inner edge of the through hole 72. The connecting protruding portions 63 are formed along the connecting recessed portions 171 by punching the electromagnetic steel plate 7.

Next, the disc portion 71 is fitted to the through hole 72. As described above, the plurality of connecting protruding portions 63 are formed along the connecting recessed portions 171 corresponding thereto. Therefore, by fitting the disc portion 71 and the through hole 72 to each other, it is possible to fit the plurality of connecting protruding portions 63 and the plurality of connecting recessed portions 171 all together.

By punching a part of the electromagnetic steel plate 7 with the disc portion 71 fitted to the through hole 72, an external shape of each core plate portion 17 (FIG. 9) and an external shape of each extending portion 62 (FIG. 10) are formed. Specifically, a portion of the disc portion 71 other than the portion that becomes the external shapes of the plurality of core plate portions 17 is punched out and separated. By the punching operation, the core plate portions 17, the extending portions 62, and the center hole 60 are formed. The core plate portions 17 are formed in a connected state with the extending portions 62. That is, in the plate member forming step S10, by fitting the connecting protruding portions 63 to the connecting recessed portions 171, the core plate portions 17 are connected to the extending portions 62.

After forming the external shapes of the core plate portions 17, when the connecting protruding portions 63 and the connecting recessed portions 171 are formed, the plurality of core plate portions 17 that have been stacked tend to come apart. As a result, it takes time and effort to fit the plurality of connecting protruding portions 63 and the plurality of connecting recessed portions 171 to each other. Therefore, in the embodiment, after assembling the disc portion 71 to the through hole 72, the external shapes of the plurality of core plate portions 17 are formed. This manufacturing method is particularly useful for relatively small medium-sized motors or small-sized motors. Note that when manufacturing the rotor of large motors in which the core plate portions 17 do not easily come apart, the core plate portions 17 may be mounted on the extending portions 62 after forming the core plate portions 17 from the disc portion 71.

Then, a part of the electromagnetic steel plate 7 is pushed out in the axial direction by a press operation to form the fixing portions 64 on an outer side of the center hole 60 of the electromagnetic steel plate 7 in the radial direction. A region where the fixing portions 64 are formed is a region that becomes the scrap portion 61 of the electromagnetic steel plate 7. Therefore, the core plate portions 17 need not be provided with fixing portions 64. Consequently, it is possible to suppress distortion of magnetic flux passing the outer cores 14 and to suppress deterioration in the magnetic characteristics of the motor A. Note that due to the "pushing out", portions that protrude towards the second side in the axial direction are formed in the fixing portions 64.

After the fixing portions 64 have been formed, the electromagnetic steel plate 7 is punched along the external shape of the plate member 6 shown in FIG. 6. This causes the plate member 6 to be formed. Note that the plate member forming step S10 includes a step of forming the core-plate-portion through holes 172 and a step of forming the pin holes 65. The step of forming the core-plate-portion through holes 172 and the step of forming the pin holes 65 may be performed, for example, before or after forming the external shapes of the core plate portions 17 after fitting the disc portion 71 to the through hole 72.

That is, in the plate member molding step S10, the plate member 6 including the scrap portion 61 having the center hole extending therethrough in the axial direction and the core plate portions 17 that are disposed continuously with the scrap portion 61 on the inner side of the center hole 60 and that each constitutes a part of a corresponding one of the outer cores 14 is formed.

Figure 11:
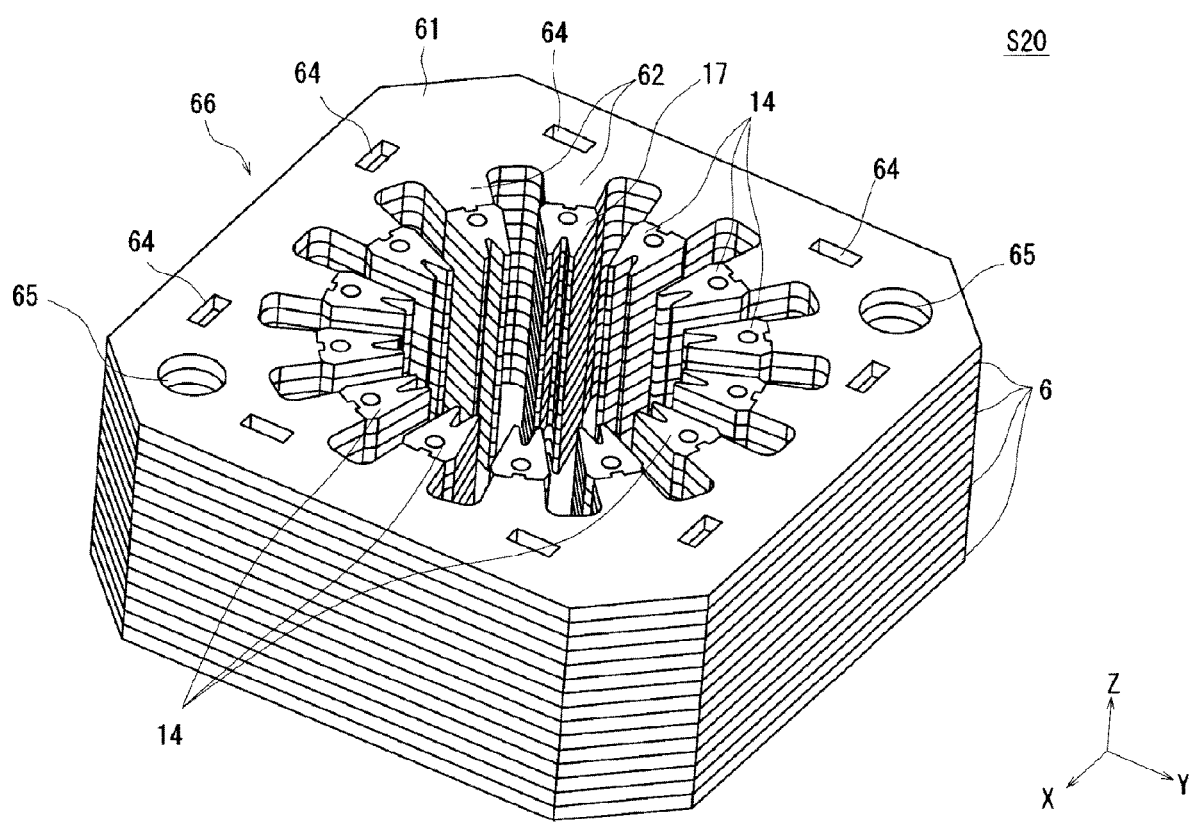
FIG. 11 shows a portion of a stacking step S20.

As shown in FIG. 11, the multilayer body forming step S20 is a step of forming a multilayer body 66 by stacking plate members 6. Each plate member 6 is successively stacked upon the first side of another plate member 6 in the axial direction. At this time, the pushed-out portions of the fixing portions 64 of a plate member 6 that is to be stacked are fitted to depressed portions of the fixing portions 64 of a plate member 6 that has already been stacked. This causes the plate members 6 that are superimposed upon each other in the axial direction to be fixed to each other.

In the embodiment, the plate members 6 formed by punching in the plate member forming step S10 are successively stacked by dropping them as they are towards the second side in the axial direction. That is, the plate member forming step S10 and the multilayer body forming step S20 are performed concurrently. This makes it possible to efficiently form the multilayer body 66. Note that the multilayer body forming step S20 may be performed after forming all of the plate members 6 constituting the multilayer body 66 by performing the plate member forming step S10.

The multilayer body 66 is formed by stacking each plate member 6 upon the first side in the axial direction. Of the plate members 6 that constitute the multilayer body 66, the fixing portions 64 of the plate member 6 disposed closest to the second side in the axial direction extend through the plate member 6 in the axial direction. In this way, by forming, as through holes, the fixing portions 64 of the plate member 6 that is closest to the second side in the axial direction, for example, when a plurality of multilayer bodies 66 are superimposed upon each other and formed, it is possible to prevent adjacent multilayer bodies 66 from being fixed to each other by the fixing portions 64.

By stacking the plate members 6 upon each other, the core plate portions 17 are stacked upon each other. This causes the outer cores 14 to be formed. That is, the multilayer body 66 includes the outer cores 14. That is, in the stacking step S20, the multilayer body 66 including the outer cores 14 is formed by stacking the plate members 6 upon each other.

Figure 12:
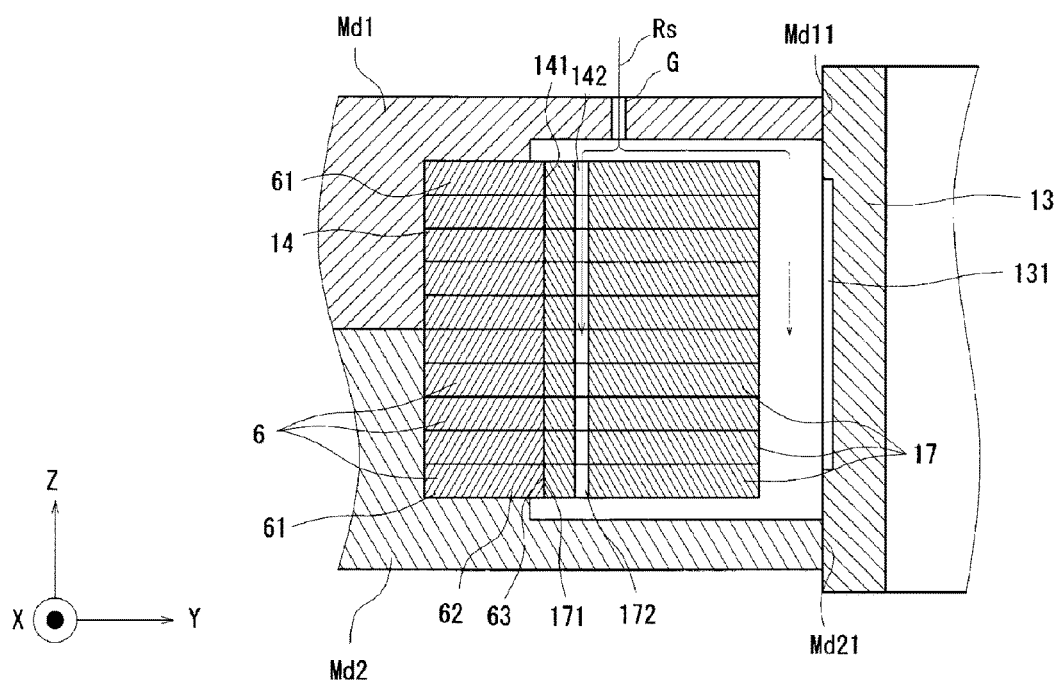
FIG. 12 shows a portion of a mold setting step S30 and molded body forming step S40.
Figure 13:
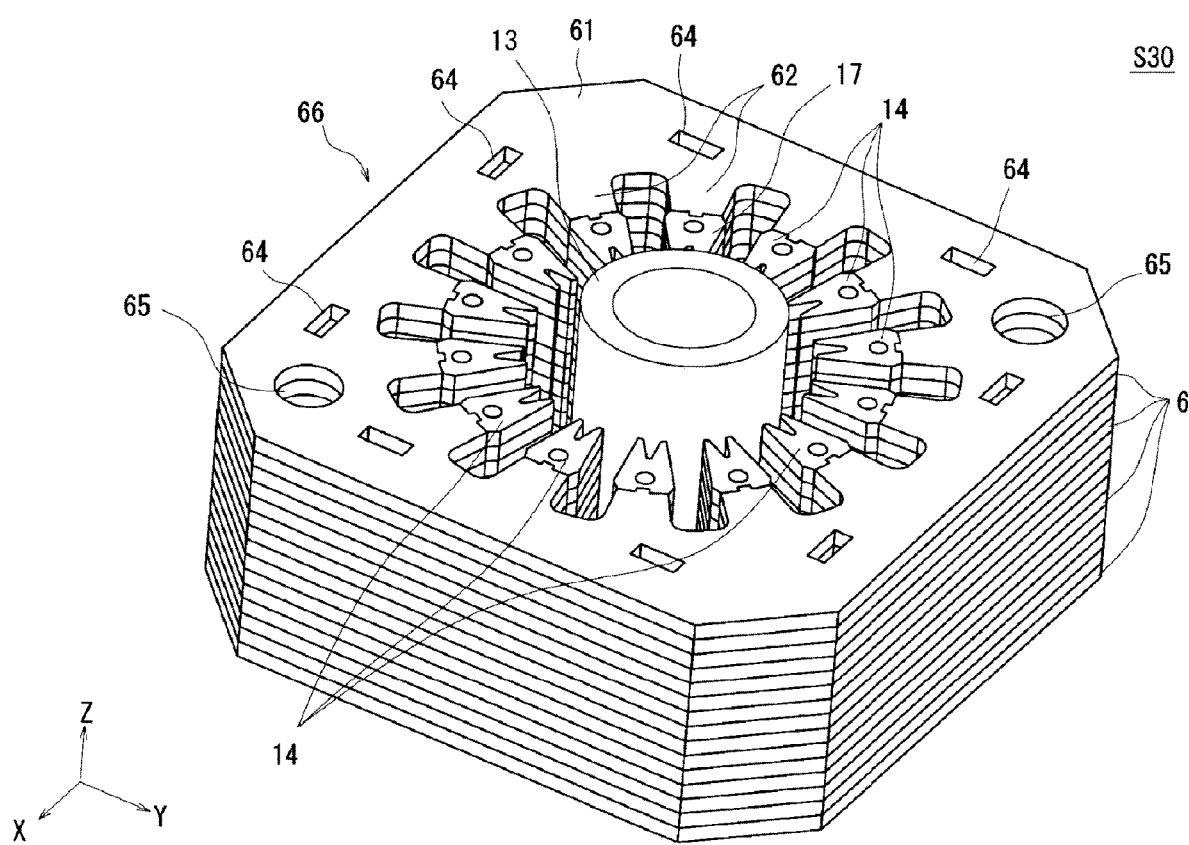
FIG. 13 is a perspective view of a multilayer body and an inner core that are set in a mold.

As shown in FIG. 12, the mold setting step S30 is a step of setting the multilayer body 66 and the inner core 13 in a mold. The order in which these are set in the mold is not particularly limited, so that the multilayer body 66 may be set first, the inner core 13 may be set first, or the multilayer body 66 and the inner core 13 may be set at the same time. A gap is formed between at least a part of the multilayer body 66 and a part of the inner core 13. That is, in the mold setting step S30, the multilayer body 66 and the inner core 13 are set in a mold Md1 and a mold Md2 with a gap in the radial direction between at least a part of the multilayer body 66 and a part of the inner core 13.

As an example, the mold includes the first mold Md1 on the first side in the axial direction and the second mold Md2 on the second side in the axial direction. First, the multilayer body 66 is set in the mold Md2. Here, as shown in FIG. 6, since each scrap portion 61 includes the extending portions 62, a part of the second mold Md2 or a jig can be disposed in a gap between extending portions 62 that are adjacent to each other in the peripheral direction. This makes it easier to stably hold the multilayer body 66 in the second mold Md2.

Next, the inner core 13 is inserted into a center hole of the multilayer body 66 that has been set in the second mold Md2 and is positioned with respect to the second mold Md2. The second mold Md2 has a hole Md21 in which the inner core 13 is inserted. The center axis of the hole Md21 in which the inner core 13 is inserted matches the center axis of the multilayer body 66. By disposing the inner core 13 in the hole Md21, the inner core 13 is positioned with respect to the second mold Md2. Here, an end portion of the inner core 13 on the second side in the axial direction protrudes towards the second side in the axial direction from the second mold Md2. Note that a gap between the hole Md21 of the second mold Md2 in which the inner core 13 is inserted and the inner core 13 is made smaller, as a result of which a resin Rs that is ejected in the molded body forming step S40 does not leak.

The first mold Md1 is disposed from the first side in the axial direction and covers the second mold Md2. Here, the first mold Md1 has a hole Md11 in which the inner core 13 is inserted. The center axis of the hole Md11 in which the inner core 13 is inserted matches the center axis of the multilayer body 66. By disposing the inner core 13 in the hole Md11, the inner core 13 is positioned with respect to the first mold Md1. That is, an intermediate portion of the inner core 13 is disposed in the first mold Md1 and the second mold Md2. Note that a gap between the hole Md11 of the first mold Md1 in which the inner core 13 is inserted and the inner core 13 is made smaller, as a result of which the resin Rs that is ejected in the molded body forming step S40 does not leak.

In the mold setting step S30, at least a portion of the inner core 13 that is covered by the filling section 15 is set in the mold Md1 and the mold Md2, and a portion of the inner core 13 protruding from the filling section 15 is set outside the mold Md1 and the mold Md2.

A space that is surrounded by the first mold Md1 and the second mold Md2 includes the grooved portion 131 of the inner core 13. That is, the multilayer body 66 and the inner core 13 are held in the first mold Md1 and the second mold Md2. Here, the center axis of the inner core 13 and the center axis of the multilayer body 66 match (see FIG. 13). For example, a part of the first mold Md1 or a jig is disposed between outer cores 14 from the first side in the axial direction. This causes a portion of the rotor core 12 where the permanent magnets are disposed to be formed.

Note that a step of forming the grooved portion 131 in the outer peripheral surface of the inner core 13 so as to be recessed inward in the radial direction is provided before the mold setting step S30. The first mold Md1 and the second mold Md2 sandwich and hold the scrap portions 61 of the plate members 6 that are disposed on two ends of the multilayer body 66 in the axial direction.

Figure 14:
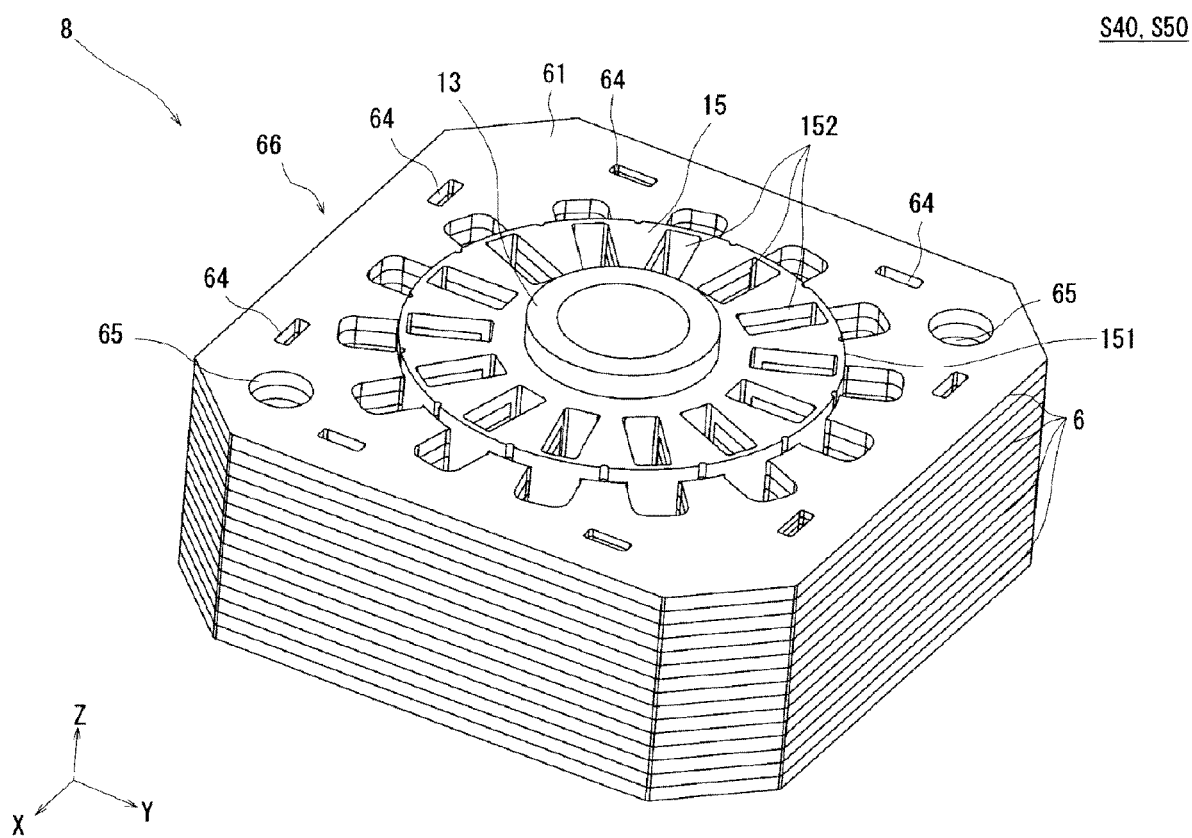
FIG. 14 is a perspective view showing a molded body.
Figure 15:
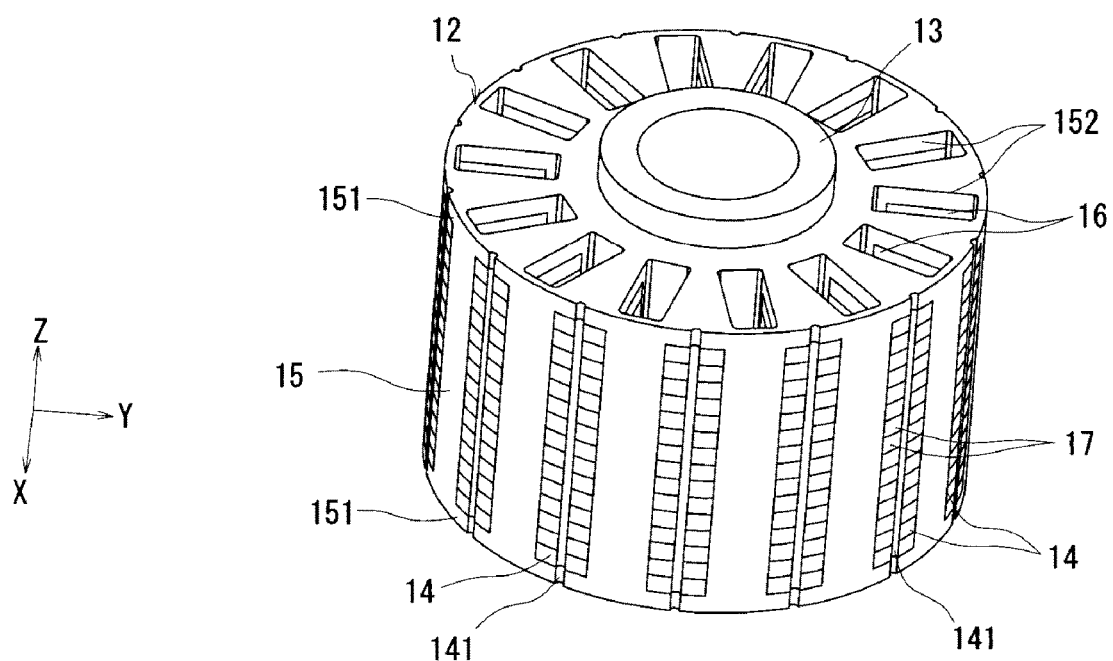
FIG. 15 is a perspective view showing the molded body after a separating step.

The molded body forming step S40 is a step of forming a molded body 8 shown in FIG. 14 by pouring a molten resin or a molten magnetic material, serving as a filling material, into the mold and forming the filling section 15. That is, in the molded body forming step S40, the molded body 8 is formed by pouring the molten filling material into gaps in the mold Md1 and the mold Md2, and forming the filling section 15, at least a part of the filling section 15 being positioned between the outer cores 14.

The molded body 8 is formed by connecting the multilayer body 66 and the inner core 13 by the filling section 15. Note that, in the description below, a case in which the filling section 15 is made of a resin, and the molten resin Rs is poured into the space in the first mold Md1 and the space in the second mold Md2 is described.

As shown in FIG. 12, in the molded body forming step S40, the resin is poured from gates G of the first mold Md1 into the first mold Md1 and the second mold Md2 where a part of the inner core 13 and the multilayer body 66 are set. The gates G face in the axial direction an end surface of each outer core 14 on the first side in the axial direction with a gap therebetween. Therefore, the resin that is poured in from the gates G collides with the end surface of each outer core 14 on the first side in the axial direction. This causes pressure from an upper side to be applied to each outer core 14 by the ejection pressure of the resin that is ejected from the gates G. Therefore, the core plate portions 17 that have been stacked are in close contact with each other. Consequently, it is possible to suppress entry of the resin to locations between the core plate portions 17 and to suppress widening of gaps between the core plate portions 17 in the axial direction. As a result, it is possible to increase the dimensional precision of each outer core 14.

As shown in FIG. 12, in the radial direction, the gates G are disposed at locations that do not correspond with the position of the outer-core through hole 142. Therefore, the resin Rs that is poured into the first mold Md1 and the second mold Md2 from the gates G applies a pressure to the end surface of each outer core 14 on the first side in the axial direction. In FIG. 12, the gates G are disposed inward of the outer-core through hole 142 in the radial direction.

As shown in FIG. 12, inside the first mold Md1 and the second mold Md2, spaces are provided at two ends of the outer cores 14 in the axial direction. When the resin Rs in the spaces at the two end portions of the outer cores 14 in the axial direction are solidified, the cover portions 151 of the filling section 15 are formed.

The plurality of plate members 6 of the multilayer body 66 are fixed to each other by the fixing portions 64. That is, the plate members 6 are fixed to each other at portions of the plate members 6 on the outer side in the radial direction. The plate members 6 are subjected to the ejection pressure of the resin Rs at portions of the plate members 6 on the inner side in the radial direction. Therefore, the plate members 6 are held down at both end sides in the radial direction. As a result, a force that causes the stacked plate members to move away from each other in an up-down direction is further suppressed.

In the molded body forming step S40, by pouring the resin Rs into the outer-core through hole 142, it is possible to dispose a part of the filling section 15 inside the outer-core through hole 142. This makes it possible to fix the core plate portions 17 to each other by the filling section 15 as described above.

The plurality of gates G are provided at the first mold Md1. The plurality of gates G are disposed at equal intervals in the peripheral direction. Therefore, the flow of the resin Rs in the first mold Md1 and the second mold Md2 can be made uniform or substantially uniform in the entire peripheral direction, and the dimensional precision of the filling section 15 can be increased.

In the mold setting step S30, the grooved portion 131 that is formed in the outer peripheral surface of the inner core 13 is disposed in the spaces inside the first mold Md1 and the second mold Md2. That is, in the mold setting step S30, the grooved portion 131 is disposed so as to face the gaps in the mold Md1 and the mold Md2 into which the filling material Rs is poured.

Therefore, the resin Rs that is poured in from the gates G is poured into the grooved portion 131. Therefore, a part of the filling section 15 is disposed in the grooved portion 131. Consequently, the inner core 13 and the filling section 15 can be more firmly fixed to each other.

The separating step S50 is a step of separating the scrap portions 61 and the core plate portions 17 of the molded body 8 from each other. In the separating step S50, the connecting protruding portions 63 and the connecting recessed portions 171 are separated from each other to separate the scrap portions 61 and the core plate portions 17 from each other. Therefore, it is easy to separate the scrap portions 61 and the core plate portions 17 from each other.

Specifically, the molded body 8 is removed from the first mold Md1 and the second mold Md2 and is set in a pressing machine. By using the pressing machine, the rotor core 12 including the inner core 13, the filling section 15, and the outer cores 14 are punched out from the molded body 8 along a boundary between the scrap portions 61 and the core plate portions 17.

Note that, in the description, "separate the scrap portions and the core plate portions" means that the scrap portions and the core plate portions only need to be capable of being detached from each other, and the means therefore is not particularly limited. For example, a case in which a portion between the scrap portions and the core plate portions is cut and a case in which this portion between the scrap portions and the core plate portions is snap-cut are also included.

In the separating step 50, a portion excluding the inner core 13, the filling section 15, and the outer cores 14, that is, the scrap portions 61 are removed from the molded body 8. As described above, in the embodiment, the fixing portions 64 that fix the plate members 6 to each other are provided in the scrap portions 61. After the molded body forming step S40, the core plate portions 17 are fixed to each other by the filling section 15. Therefore, even if the scrap portions 61 are removed, the core plate portions 17 are not separated from each other, and the shapes of the outer cores 14 are maintained.

Figure 16:
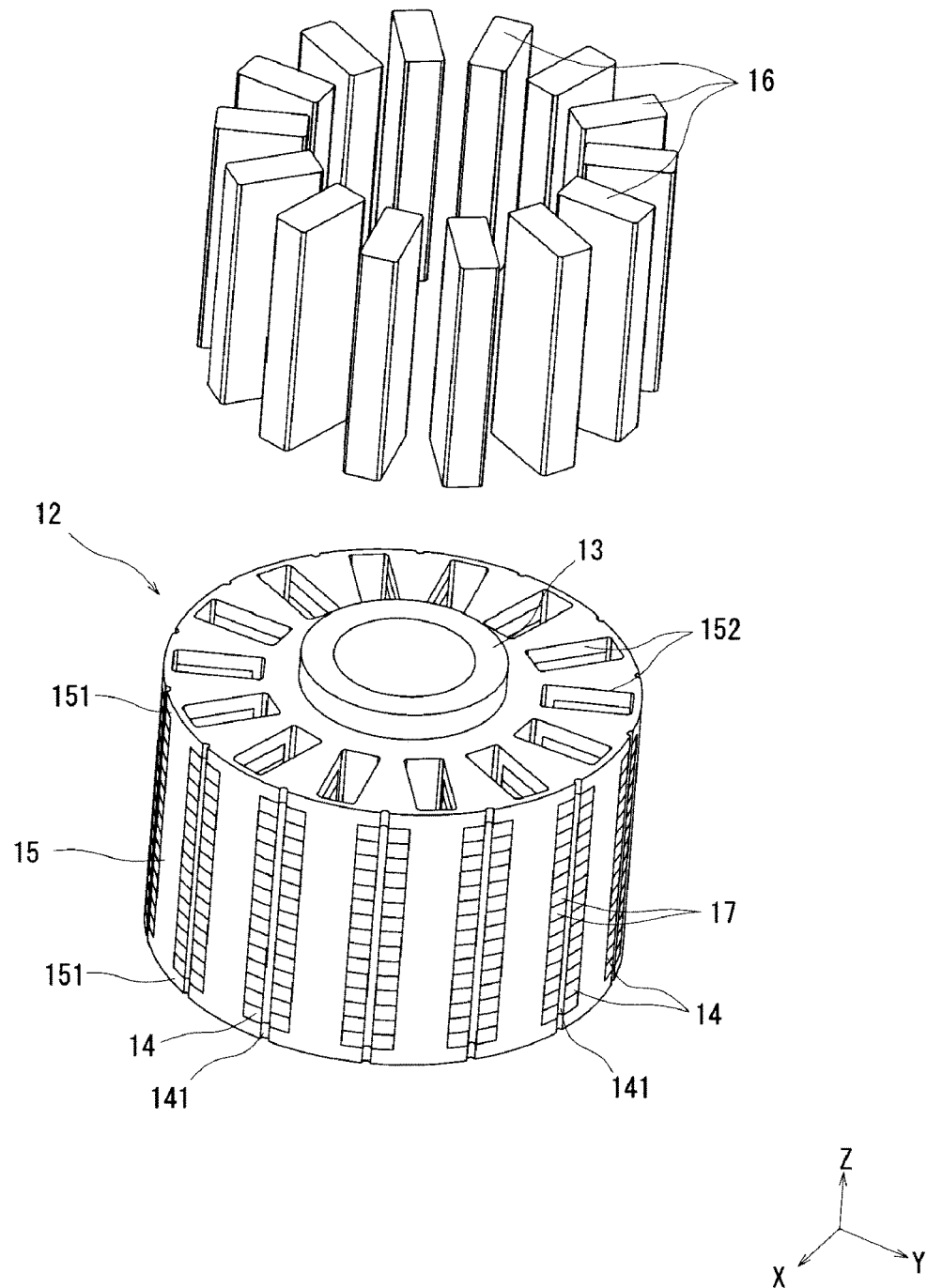
FIG. 16 shows a magnet mounting step S51.

As shown in FIG. 16, in the magnet mounting step S51, the permanent magnets 16 are inserted from the openings of the magnet insertion holes 152 provided in the cover portion 151 on the first side of the rotor core 12 in the axial direction.

Figure 17:
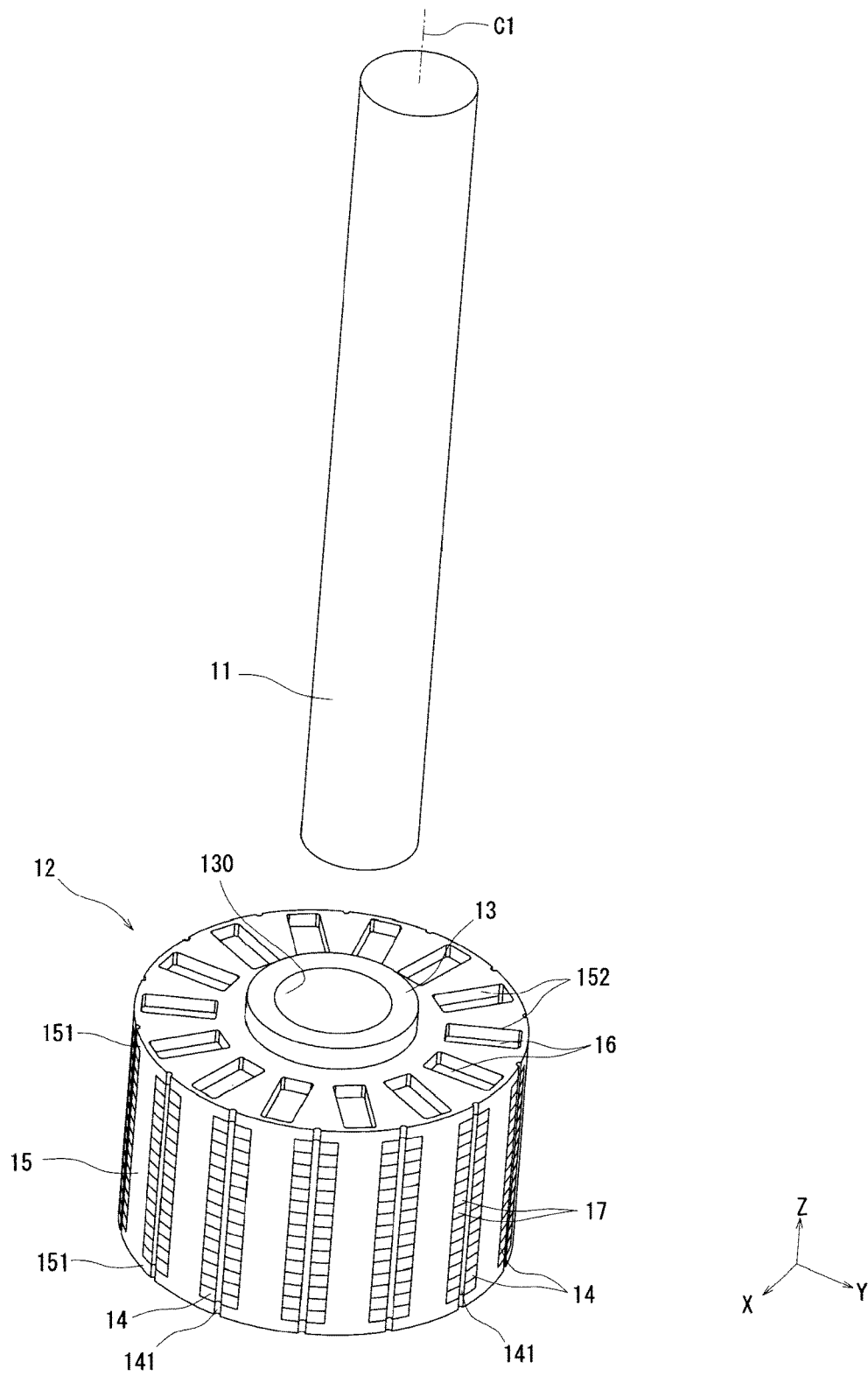
FIG. 17 shows a shaft mounting step S60.

As shown in FIG. 17, the shaft mounting step S60 is a step of mounting the shaft 11 in the inner core 13 of the rotor core 12 where the permanent magnets 16 have been mounted. The shaft 11 is mounted in the inner core 13 by, for example, press-fitting the outer peripheral surface of the shaft 11 to an inner peripheral surface 130 of the inner core 13. This causes the shaft 11 to be fixed to the inner core 13, that is, the rotor core 12. Note that the fixing of the shaft 11 and the inner core 13 to each other is not limited to press-fitting. For example, it is possible to insert the shaft 11 into the inner core 13 and bond the shaft 11 to the inner core 13. That is, the shaft mounting step S60 is provided after the molded body forming step S40 to fix the shaft 11 in the inner core 13.

The fixing may be performed by fixing portions that fix both ends of the inner core 13 in the axial direction. The fixing portions may be an external thread provided on the shaft 11 and a nut having an internal thread that is capable of being screwed onto the external thread and a washer holding down the inner core 13. Other methods of fixing the shaft 11 to the inner core 13 can be widely used. In this way, the shaft 11 can be made removable from the inner core 13 by the fixing using fasteners. That is, the shaft 11 is removable from the inner core 13 and may further include a fixing portion that fixes the shaft 11 and the inner core 13 to each other.

In the embodiment, in the mold setting step S30, an end portion of the inner core 13 on the first side in the axial direction protrudes from the first mold Md1. The end portion of the inner core 13 on the second side in the axial direction protrudes from the second mold Md2. That is, an inner peripheral surface of the hole of the first mold Md1 and an inner peripheral surface of the hole of the second mold Md2 are made to contact the outer peripheral surface of the inner core 13. Therefore, by using at least the inner core 13 whose portions that contact the first mold Md1 and the second mold Md2 have the same outside diameter, even if the first mold Md1 and the second mold Md2 are not changed, it is possible to manufacture rotor cores 12 having different shapes. For example, rotor cores 12 to be mounted on shafts 11 having different diameters may be manufactured. In this case, an inner core 13 having a common outside diameter and having inside diameters corresponding to the shafts 11 are used. This makes it possible to, by using the common first mold Md1 and the common second mold Md2, to manufacture rotor cores 12 to be mounted on shafts 11 having different outside diameters.

Note that the mold according to the embodiment includes the first mold Md1 that is disposed from the first side in the axial direction and the second mold Md2 that is disposed from the second side in the axial direction. Therefore, in the molded body forming step S40, after forming the molded body 8, it can be formed by moving the first mold Md1 towards the first side in the axial direction and the second mold Md2 towards the second side in the axial direction. This makes it possible to simplify the manufacturing step because the mold ejection direction is uniaxial. In addition, since the structure of the mold is also simplified, it is possible to reduce the costs required for manufacturing the mold. However, it is not limited thereto. For example, at least one mold that is disposed from the outer side in the radial direction may be provided. Note that "the costs required for manufacturing" here includes the time, labor, and material required for the manufacturing.

The sensor magnet 52 is mounted on the shaft 11 fixed to the rotor core 12. Specifically, the sensor yoke 51 is press-fitted to the shaft 11. The rotor 1, the stator 2, the first bearing 41, and the second bearing 42, which have been described above, are accommodated in the housing 3. This causes the motor A including the above-described rotor 1 to be manufactured.

Figure 18:
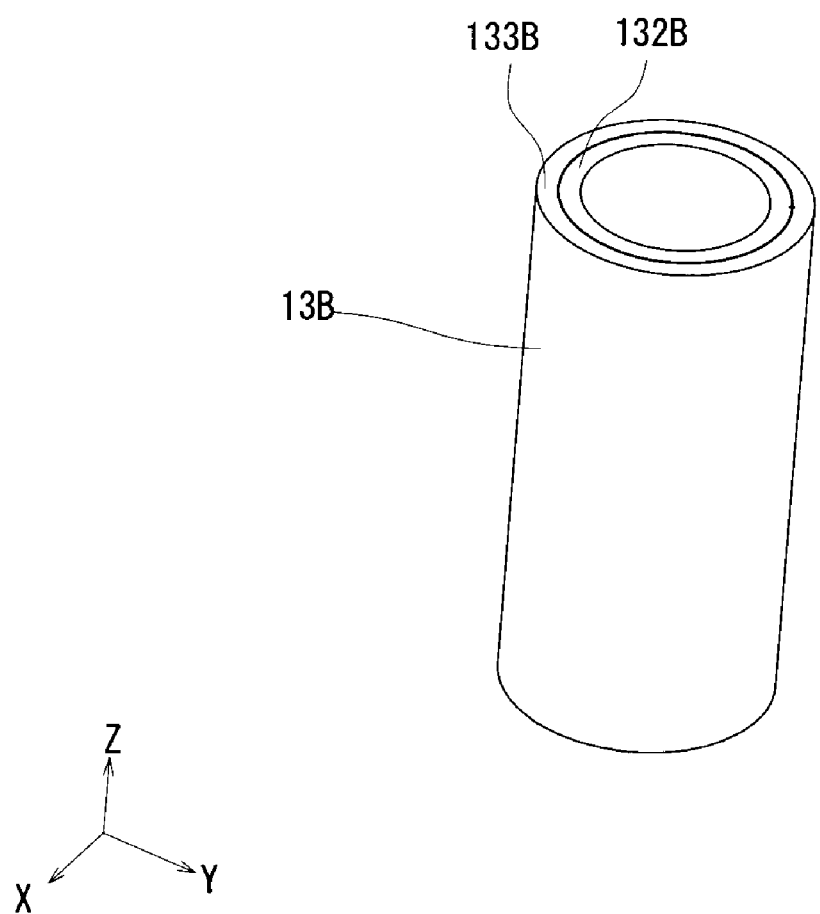
FIG. 18 is a perspective view showing another example of an inner core of a rotor according to an exemplary embodiment of the present disclosure.

FIG. 18 is a perspective view showing another example of an inner core of the rotor according to the embodiment. An inner core 13B shown in FIG. 18 includes an inner cylindrical body 132B on the inner side in the radial direction and an outer cylindrical body 133B on the outer side of the inner cylindrical body 132B. That is, the inner core 13B includes a plurality of cylindrical bodies that are adjacent to each other in the radial direction.

The outer cylindrical body 133B is disposed in the first mold Md1 and the second mold Md2 to form the molded body 8. That is, in the mold setting step S30, at least the outer cylindrical body 133B of the inner core 13B that is disposed on the outermost side in the radial direction is set in the molds Md1 and Md2. When the shaft 11 having an outside diameter that is the same or substantially the same as the inside diameter of the outer cylindrical body 133B is to be fixed, the shaft 11 is directly fixed to the outer cylindrical body 133B. Note that, for the fixing of the outer cylindrical body 133B and the shaft 11, press-fitting may be mentioned; however, the fixing is not limited thereto.

A shaft 11 having an outside diameter that is smaller than the inside diameter of the outer cylindrical body 133B may be fixed. After fixing the inner cylindrical body 132B to the shaft 11, the inner cylindrical body 132B is fixed to the outer cylindrical body 133B. Note that the inner cylindrical body 132B is press-fitted to the outer cylindrical body 133B. This causes the shaft 11 to be fixed to the rotor core 12. An outer peripheral surface of the inner cylindrical body 132B and an inner peripheral surface of the outer cylindrical body 133B each have a shape and size that allow press-fitting. Note that, although, in the embodiment, the inner cylindrical body 132B is previously fixed to the shaft 11, the fixing is not limited thereto. For example, it is possible to, after inserting the shaft 11 into the outer cylindrical body 133B, insert the inner cylindrical body 132B between the shaft 11 and the outer cylindrical body 133B to fix the shaft 11 and the rotor core 12 to each other. Although the inner core 13B includes two cylindrical bodies, the inner cylindrical body 132B and the outer cylindrical body 133B, the inner core 13B is not limited thereto. It may include three or more cylindrical bodies.

In this way, when the inner core 13B includes a plurality of cylindrical bodies that are adjacent to each other in the peripheral direction, it is possible to fix shafts 11 having different outside diameters by using one type of rotor core 12.

Figure 19:
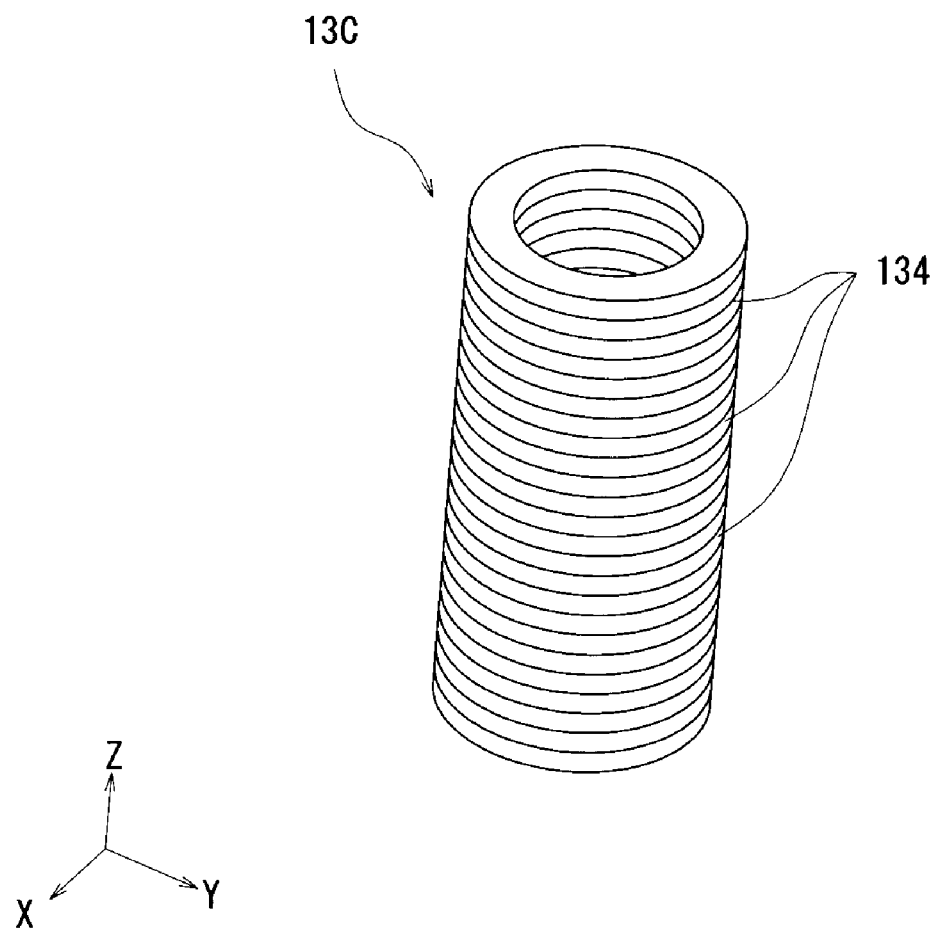
FIG. 19 is a perspective view of another example of an inner core of a rotor according to an exemplary embodiment of the present disclosure.

FIG. 19 is a perspective view of another example of an inner core of the rotor according to the embodiment. An inner core 13C shown in FIG. 19 has a structure in which ring-shaped plate portions 134 are stacked in the axial direction. In the plate member molding step S10, the ring-shaped plate portions 134 are molded by punching into ring shapes a portion of the disc portion 71 remaining after forming the plurality of core plate portions 17 by punching. Then, the ring-shaped plate portions 134 formed by punching into the ring shapes are stacked and formed. That is, the inner core 13C is a multilayer cylindrical body including the ring-shaped plate materials 134 that are stacked upon each other.

By forming the inner core 13C into a multilayer body including the ring-shaped plate portions 134, uneven portions are formed at an outer peripheral surface of the inner core 13C. In the molded body forming step S40, an ejected resin Rs enters the uneven portions of the ring-shaped plate portions 134. Therefore, even if the outer peripheral surface of the inner core 13C is not provided with a grooved portion 131, it is possible to more firmly fix the inner core 13C and the filling section 15 to each other.

Figure 9:
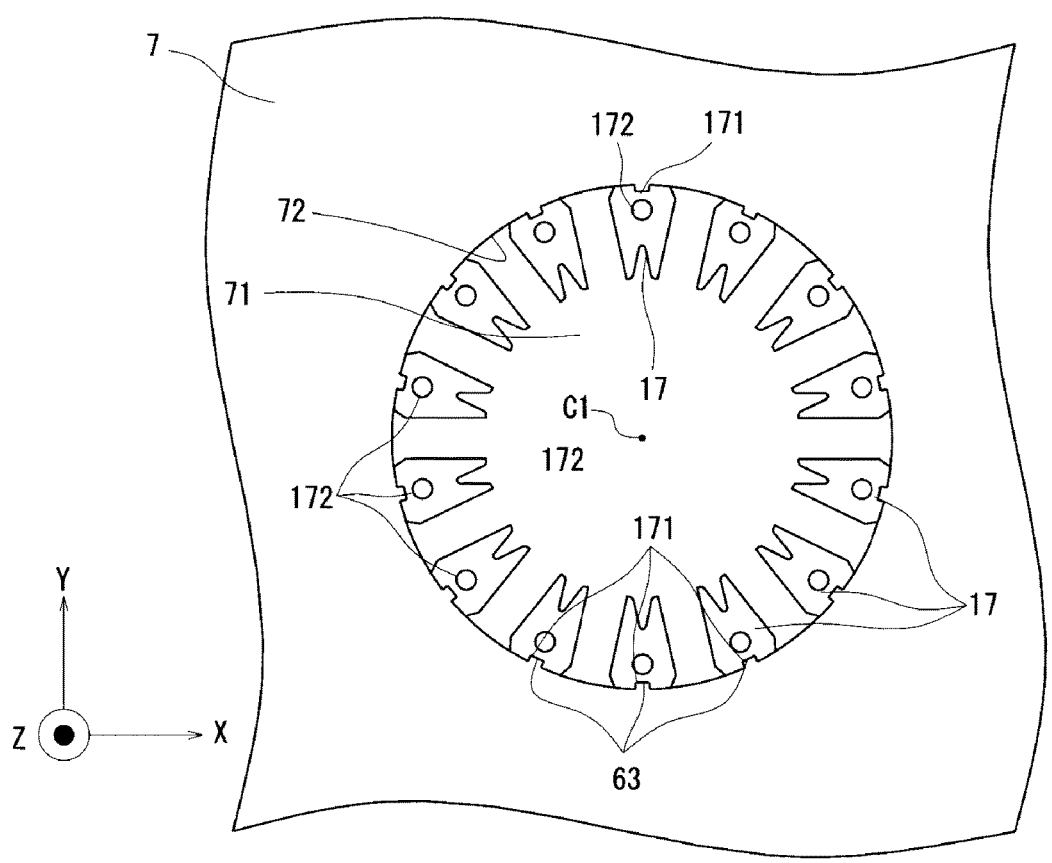
FIG. 9 shows a portion of the plate molding step S10.
Figure 10:
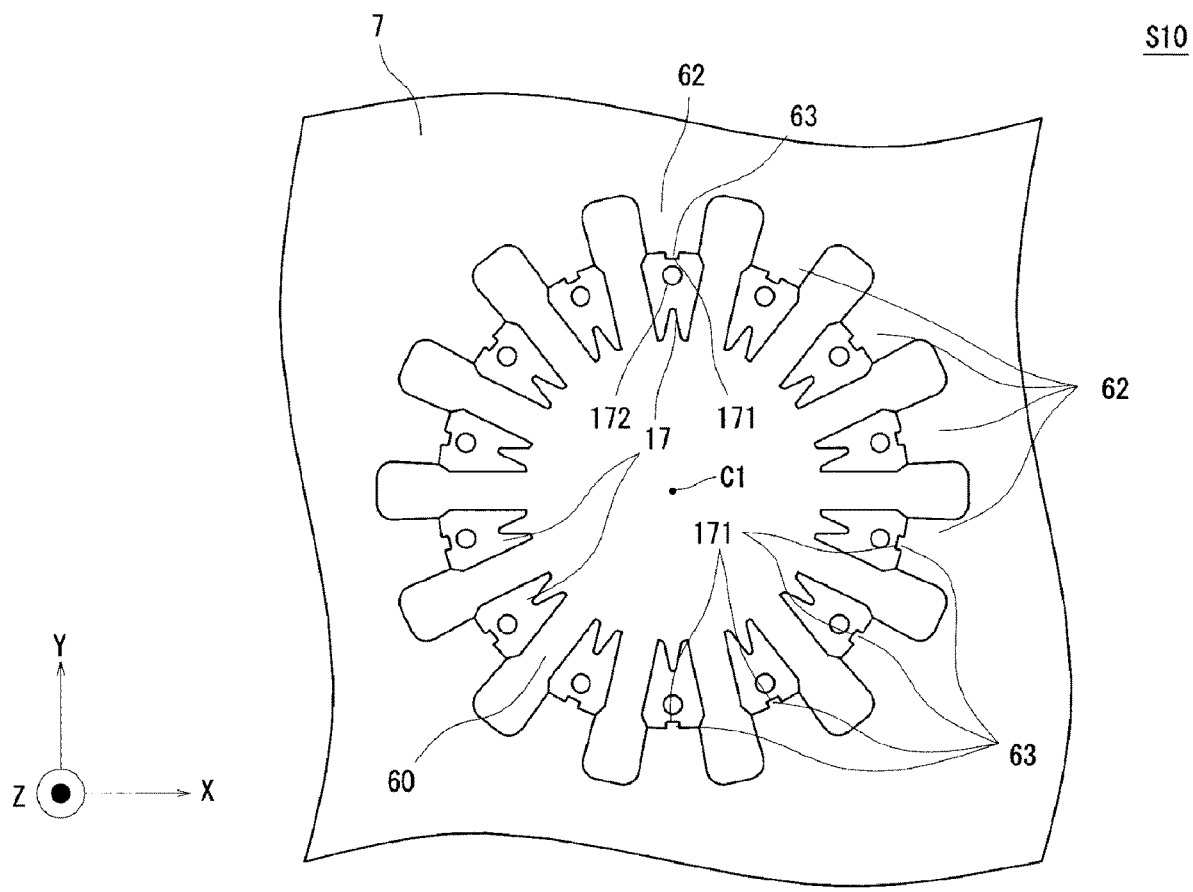
FIG. 10 shows a portion of the plate molding step S10.

The ring-shaped plate portions 134 can be molded out of an unnecessary portion that is produced when manufacturing the multilayer body 66, such as a portion of the disc portion 71, shown, for example, in FIG. 9, remaining after molding the core plate portions 17. Therefore, it is possible to cut manufacturing costs of the inner core 13C. Note that the inner core 13C may be molded out of a remaining portion of the scrap portion 61. The step of forming the core plate portions 17 by punching included in the plate member molding step may be performed after the stacking step and, after forming the stacked core plate portions 17 by punching, stacked disc portions 71 may be punched into a cylindrical or substantially cylindrical shape.

That is, the ring-shaped plate material forming step of forming the ring-shaped plate materials 134 constituting a part of the inner core 13C and the inner core forming step of forming the multilayer cylindrical body by stacking the ring-shaped plate materials 134 may be provided before the mold setting step S30. Note that, in the inner core 13B, at least one of the plurality of cylindrical bodies is a multilayer cylindrical body including ring-shaped plate materials 134 that are stacked upon each other.

A method of manufacturing a rotor according to an exemplary second embodiment of the present disclosure is described with reference to the drawings. Note that the method of manufacturing a rotor according to the embodiment includes a shaft mounting step S601 in place of the shaft mounting step S60. In addition, the method includes a molded body forming step S401 in place of the molded body forming step S40.

Figure 20:
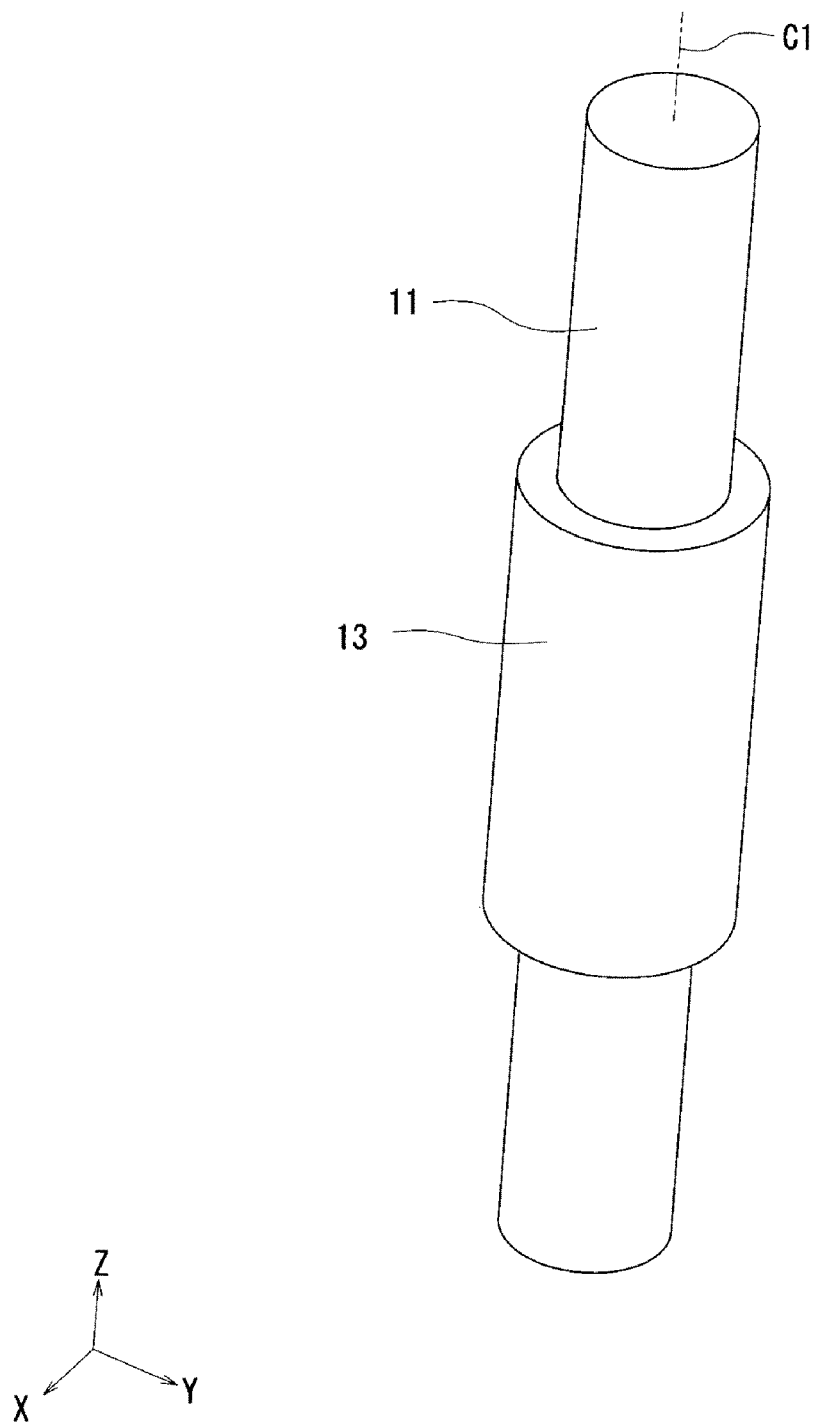
FIG. 20 is a perspective view of a state in which a shaft is mounted in an inner core.
Figure 21:
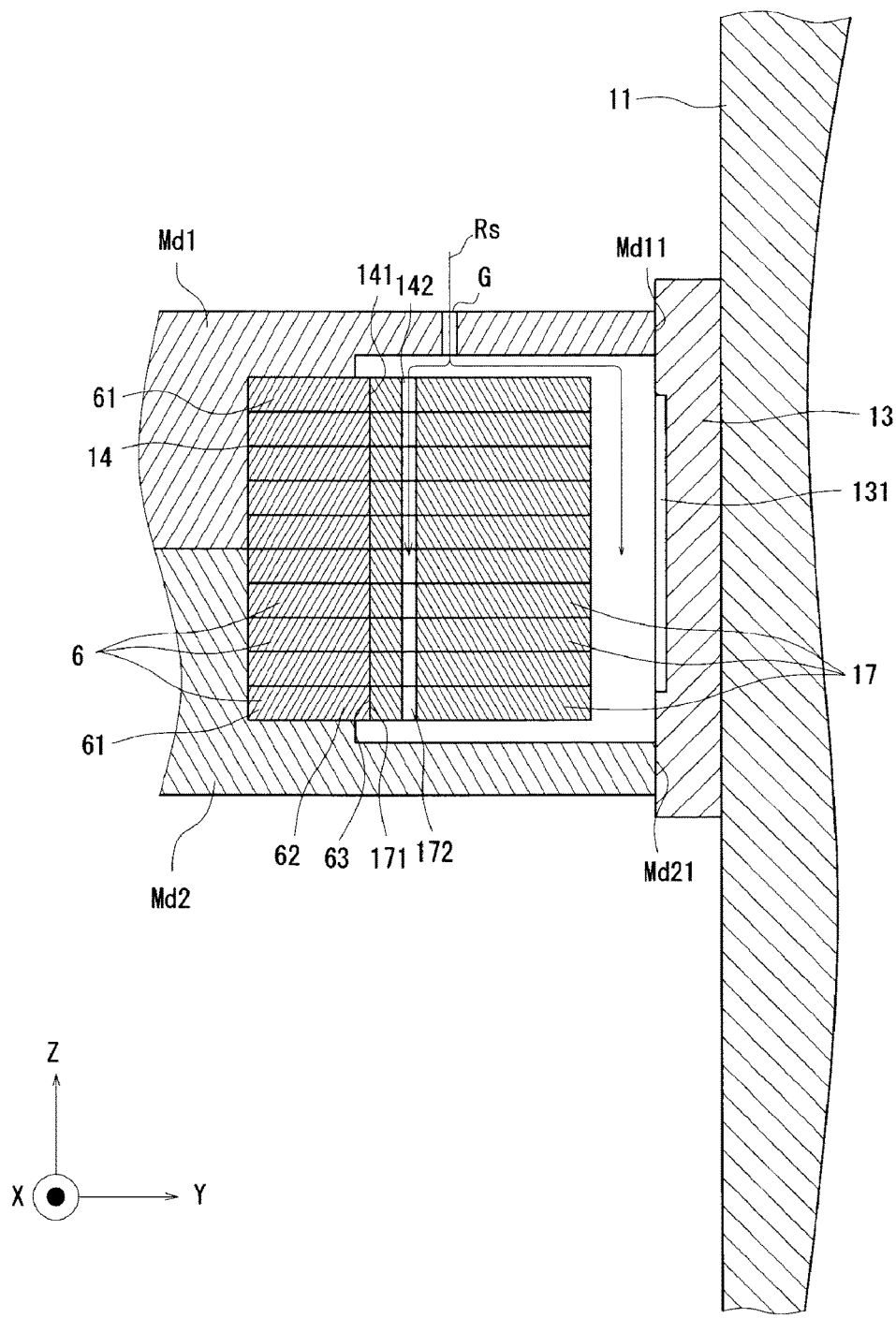
FIG. 21 shows a state in which the inner core in which the shaft is mounted is set in the mold.
Figure 22:
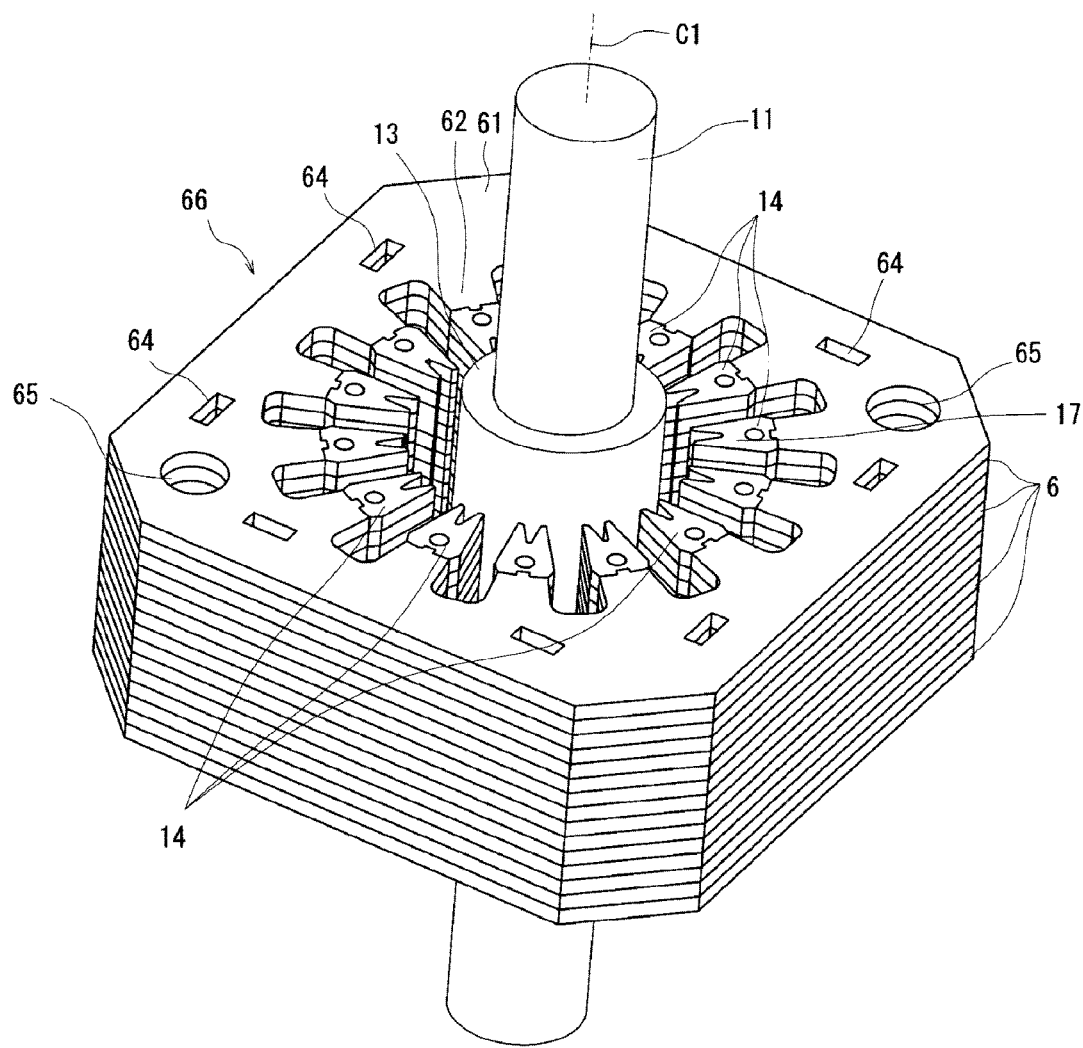
FIG. 22 is a perspective view showing a multilayer body, the inner core, and the shaft disposed in the mold.
Figure 23:
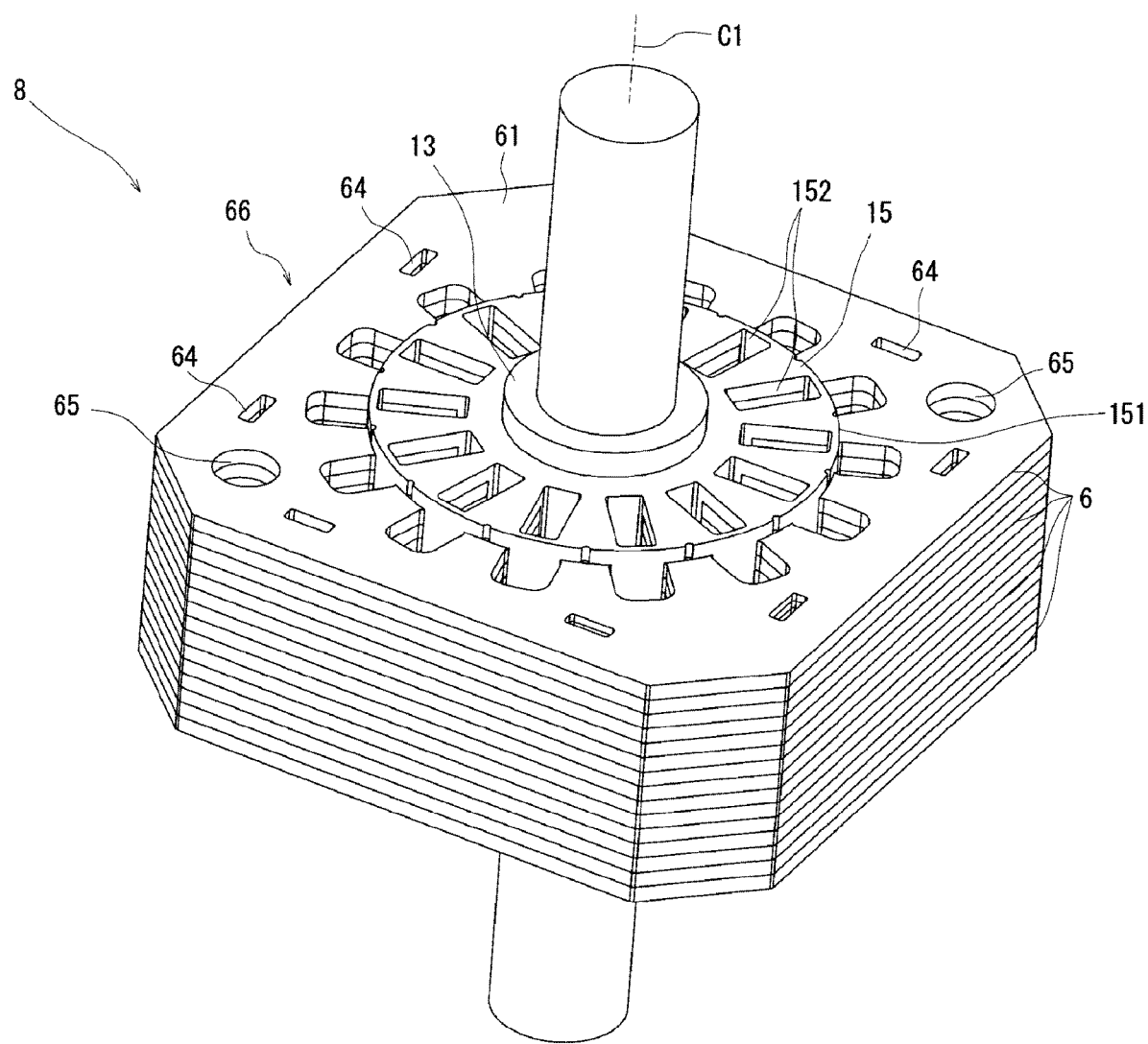
FIG. 23 is a perspective view of a molded body before separation.

FIG. 20 is a perspective view of a state in which a shaft is mounted in an inner core. FIG. 21 shows a state in which the inner core in which the shaft is mounted is set in the mold. FIG. 22 is a perspective view showing a multilayer body, the inner core, and the shaft disposed in the mold. FIG. 23 is a perspective view of a molded body before separation.

FIG. 20 shows a part of the shaft mounting step S601. As shown in FIG. 20, a shaft 11 is fixed to a cylindrical inner core 13. That is, the shaft mounting step S601 is provided before the mold setting step S30. Note that the shaft mounting step S601 may be provided before the plate material molding step S10 or before the stacking step S20. The shaft mounting step S601 may be performed concurrently with one or both of these steps.

As shown in FIGS. 21 and 22, in the mold setting step S30, the inner core 13 to which the shaft 11 is fixed is mounted in the first mold Md1 and the second mold Md2. An outer peripheral surface of the inner core 13 contacts the hole of the first mold Md1. The outer peripheral surface of the inner core 13 also contacts the hole of the second mold Md2. Therefore, in the mold setting step S30, if the outside diameter of the inner core 13 is the same, the molded body forming step S40 can be performed by using the same first mold Md1 and second mold Md2 regardless of whether there is a shaft 11.

Then, in the molded body forming step S40, a molded body 8 is formed after pouring a resin Rs.

As described above, in the embodiment, the shaft 11 is fixed to the inner core 13 before forming the filling section 15. Therefore, when the filling section 15 is included, it is possible to use a fixing method that cannot be used or that is difficult to use, such as shrink fitting or welding.

Although the embodiments of the present disclosure have been described above, the embodiments can be variously modified within the scope of the spirit of the present disclosure.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A method of manufacturing a rotor including a cylindrical inner core extending along a center axis, a plurality of outer cores arrayed side by side in a circumferential direction about the center axis on an outer side of the inner core in a radial direction perpendicular to the center axis, and a filling section that covers at least a portion of the inner core and at least a portion of each of the plurality of outer cores, the method comprising:
 forming plates each including a scrap portion that has a center hole extending therethrough in an axial direction and core plate portions that are disposed continuously with the scrap portion on an inner side of the center hole and that each defines a portion of a corresponding one of the outer cores, the scrap portion defining a radially outermost portion of the plates;
 forming a multilayer body including the outer cores by stacking the plates;
 setting at least a portion of the multilayer body and a portion of the inner core in a mold with a gap therebetween in the radial direction;
 forming a molded body by pouring a molten filling material into the gap in the mold and forming the filling section, at least a portion of the filling section being positioned between the outer cores;
 separating the scrap portion and the core plate portions from each other after forming the molded body; and
 before the setting, forming a grooved portion in an outer peripheral surface of the inner core so as to be recessed inward in the radial direction; wherein
 in the setting, the grooved portion is disposed so as to face the gap in the mold into which the filling material is poured.

2. The method of manufacturing the rotor according to claim 1, further comprising, after forming the molded body, fixing a shaft extending along the center axis in the inner core.

3. The method of manufacturing the rotor according to claim 1, further comprising, before the setting, fixing the shaft in the inner core; wherein
 in the setting, at least a portion of the inner core that is covered by the filling section is set in the mold, and a portion of the inner core protruding from the filling section is set outside the mold.

4. The method of manufacturing the rotor according to claim 1, wherein the inner core includes a plurality of cylindrical bodies that are adjacent to each other in the radial direction.

5. The method of manufacturing the rotor according to claim 4, wherein, in the setting, at least a cylindrical body of the inner core that is disposed on an outermost side of the inner core in the radial direction is set in the mold.

6. The method of manufacturing the rotor according to claim 1, wherein
- the inner core is a multilayer cylindrical body including ring-shaped plate materials that are stacked upon each other; and
- the method further includes:
- before the setting, forming the ring-shaped plate materials defining a portion of the inner core and forming the multilayer cylindrical body by stacking the ring-shaped plate materials upon each other.

7. The method of manufacturing the rotor according to claim 4, wherein
- at least one of the plurality of cylindrical bodies is a multilayer cylindrical body including ring-shaped plate materials that are stacked upon each other; and
- the method further includes:
- before the setting, forming the ring-shaped plate materials and forming the multilayer cylindrical body by stacking the ring-shaped plate materials upon each other.

* * * * *